United States Patent
Hoppe et al.

(10) Patent No.: US 9,885,571 B2
(45) Date of Patent: Feb. 6, 2018

(54) ATTACHABLE LEVEL WITH ROTATABLE BUBBLE VIAL

(71) Applicant: Milwaukee Electric Tool Corporation, Brookfield, WI (US)

(72) Inventors: Christopher S. Hoppe, Milwaukee, WI (US); Steven W. Hyma, Milwaukee, WI (US); Grant T. Squiers, Cudahy, WI (US); Roger D. Neitzell, Palmyra, WI (US); Ryan D. Schwoegler, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 266 days.

(21) Appl. No.: 14/805,595

(22) Filed: Jul. 22, 2015

(65) Prior Publication Data

US 2016/0025490 A1    Jan. 28, 2016

Related U.S. Application Data

(60) Provisional application No. 62/027,543, filed on Jul. 22, 2014, provisional application No. 62/184,629, filed on Jun. 25, 2015, provisional application No. 62/167,044, filed on May 27, 2015.

(51) Int. Cl.
  *G01C 9/34*  (2006.01)
  *G01C 9/26*  (2006.01)
(52) U.S. Cl.
  CPC  *G01C 9/34* (2013.01); *G01C 9/26* (2013.01)
(58) Field of Classification Search
  CPC .................................................. G01C 9/34
  USPC ............................................................ 33/371
  See application file for complete search history.

(56) References Cited

U.S. PATENT DOCUMENTS

| | | | | |
|---|---|---|---|---|
| 297,719 A * | 4/1884 | Root | ...................... | G01C 9/28 33/371 |
| 450,457 A * | 4/1891 | Green | ...................... | G01C 9/28 33/334 |
| 968,679 A * | 8/1910 | Oehrle | ........................... | 33/342 |
| 1,963,805 A * | 6/1934 | Walter | ...................... | G01C 9/26 33/340 |

(Continued)

FOREIGN PATENT DOCUMENTS

| CN | 2150528 Y | 12/1993 |
|---|---|---|
| CN | 101198838 A | 6/2008 |

(Continued)

OTHER PUBLICATIONS

Klein Tools, Accu-Bend Level, Cat. No. 9317RE <http://www.kleintools.com/catalog/electricians-levels/accu-bend-level> webpage accessed Jul. 21, 2014.

(Continued)

*Primary Examiner* — Christopher Fulton
(74) *Attorney, Agent, or Firm* — Reinhart Boerner Van Deuren s.c.

(57) ABSTRACT

A level is selectively coupled to a work piece and includes a housing, an adjustable clamping mechanism configured to selectively couple the housing to the work piece, a first bubble vial coupled to the housing and operable to indicate a first levelness of the work piece, and a second bubble vial rotatably coupled to the housing about a first axis. The second bubble vial is operable to indicate a second levelness of the work piece.

17 Claims, 17 Drawing Sheets

(56) References Cited

U.S. PATENT DOCUMENTS

| | | | | |
|---|---|---|---|---|
| 1,969,052 | A * | 8/1934 | West | G01C 9/12 33/372 |
| 2,652,628 | A * | 9/1953 | Johansen | G01C 9/24 33/341 |
| 2,777,210 | A * | 1/1957 | Johnson | B23Q 17/2266 33/371 |
| 2,834,116 | A * | 5/1958 | Hambrick | B25D 5/00 33/371 |
| 2,878,569 | A * | 3/1959 | Metrulis | G01B 3/04 33/388 |
| 2,932,225 | A * | 4/1960 | Gardner | B21D 7/063 72/31.05 |
| 4,394,799 | A * | 7/1983 | Moree | G01C 9/28 33/343 |
| 4,922,621 | A * | 5/1990 | Maier | B25H 7/00 33/451 |
| 4,934,706 | A * | 6/1990 | Marshall | A63B 69/3632 33/334 |
| 5,154,000 | A | 10/1992 | Mahoney et al. | |
| 5,167,075 | A * | 12/1992 | Weldy | G01C 9/34 33/343 |
| 5,279,041 | A * | 1/1994 | Wright | G01C 9/28 33/379 |
| 6,782,628 | B2 * | 8/2004 | Liao | G01C 9/28 33/384 |
| 6,839,973 | B1 * | 1/2005 | Woodward | G01C 9/28 33/343 |
| 6,901,671 | B2 * | 6/2005 | Lim | G01C 9/36 33/384 |
| 6,973,733 | B2 * | 12/2005 | Levine | G01B 3/04 33/451 |
| D529,826 | S | 10/2006 | Jordan et al. | |
| 8,061,051 | B2 | 11/2011 | Allemand | |
| 8,646,186 | B2 * | 2/2014 | Lettkeman | G01C 9/28 33/365 |

FOREIGN PATENT DOCUMENTS

| | | |
|---|---|---|
| TW | 420295 | 11/2000 |
| TW | 412008 | 1/2001 |
| TW | 514250 | 12/2002 |

OTHER PUBLICATIONS

Greenlee, Level, Bubble, Cat. No: L77 <http://www.greenlee.com/products/LEVEL%2540c-BUBBLE-(POP).html> evpage accessed Jul. 21, 2014.

* cited by examiner

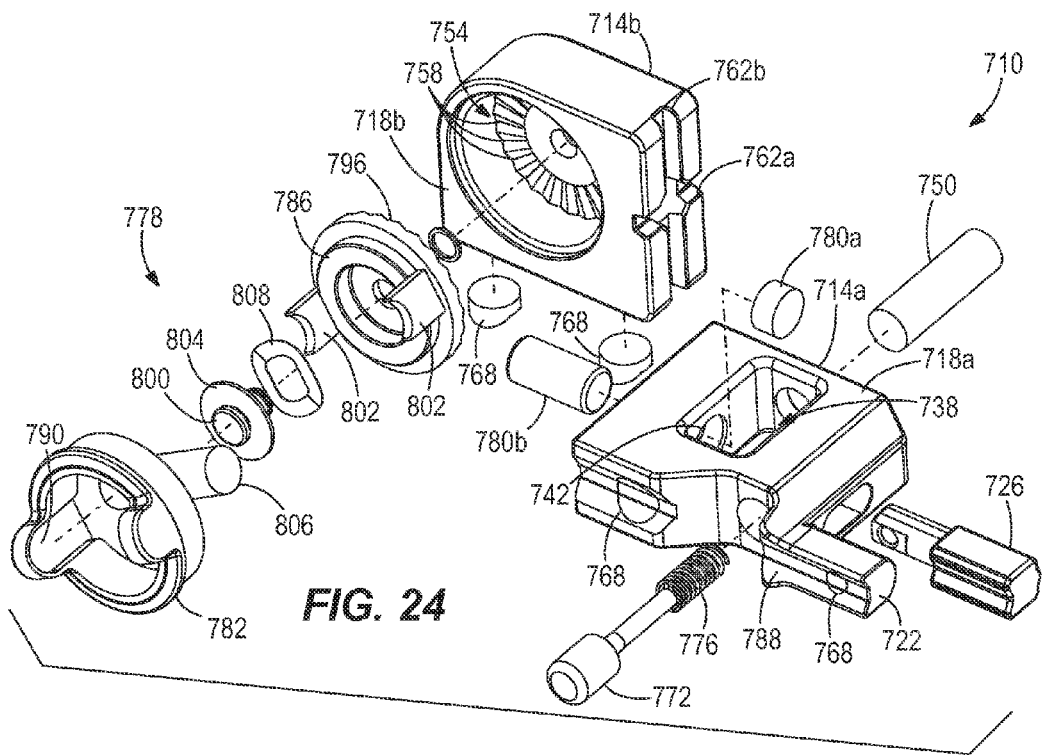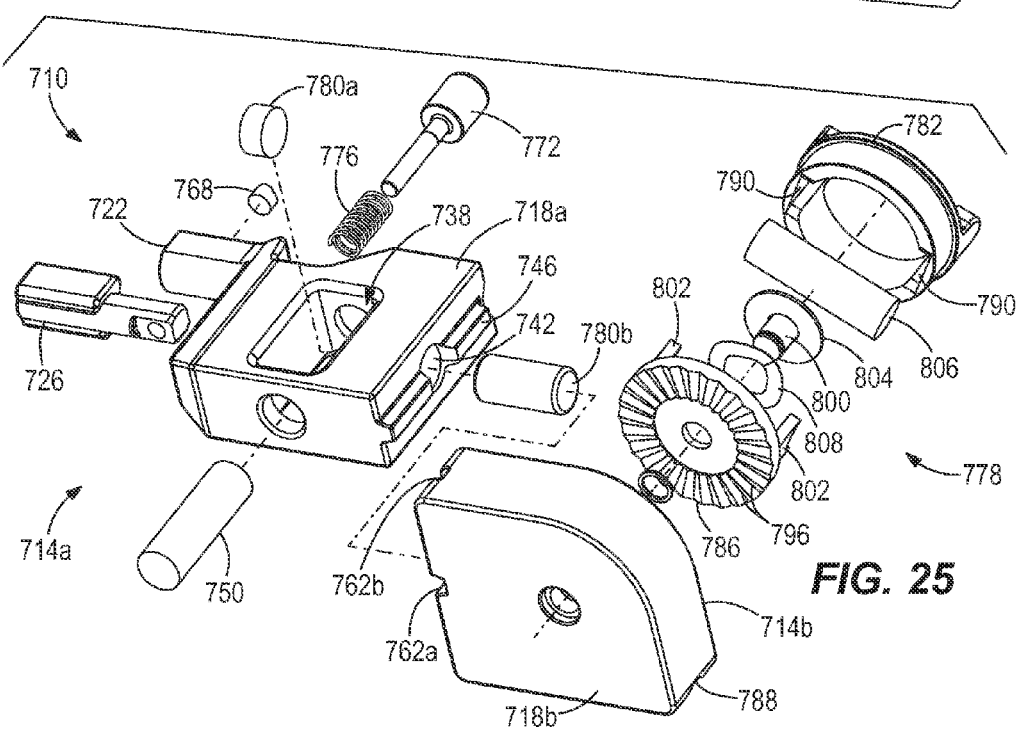

ATTACHABLE LEVEL WITH ROTATABLE BUBBLE VIAL

CROSS-REFERENCE TO RELATED APPLICATIONS

This application claims priority to U.S. Provisional Application No. 62/027,543, filed Jul. 22, 2014, U.S. Provisional Application No. 62/167,044, filed May 27, 2015, and U.S. Provisional Application No. 62/184,629, filed Jun. 25, 2015, the entire contents of which are incorporated herein by reference.

BACKGROUND

The present invention relates to hand tools used to level a work piece, and more particularly to hand tools couplable to a work piece to level the work piece.

SUMMARY

In one embodiment, a level is selectively coupled to a work piece and includes a housing, an adjustable clamping mechanism configured to selectively couple the housing to the work piece, a first bubble vial coupled to the housing and operable to indicate a first levelness of the work piece, and a second bubble vial rotatably coupled to the housing about a first axis. The second bubble vial is operable to indicate a second levelness of the work piece.

In another embodiment, a level is selectively coupled to a work piece and includes a housing having a first side surface and a second side surface. Each of the first side surface and the second side surface defining a plane. The level also includes an adjustable clamping mechanism coupled to the housing and configured to selectively couple the housing to the work piece. The level further includes a bubble vial coupled to the housing and rotatable about a first axis. The bubble vial is operable to indicate a levelness of the work piece. The bubble vial is visible from a line of sight coplanar with one of the planes defined by the first side surface and the second side surface.

In yet another embodiment, a level is selectively coupled to a tool and indicating a levelness of the tool. The level includes a housing having a first planar surface opposite a second planar surface and a first face surface opposite a second face surface. The first planar surface and the second planar surface are perpendicular to the first face surface and the second face surface. The housing defines a longitudinal axis. The level also includes a recess extending into the second face surface adjacent the first planar surface. The recess is configured to receive a portion of the tool. The second face surface and a side of the tool are substantially coplanar when the recess engages the tool.

Other aspects of the invention will become apparent by consideration of the detailed description and accompanying drawings.

BRIEF DESCRIPTION OF THE DRAWINGS

FIG. 24 is a front exploded view of the level of FIG. 23.

FIG. 25 is a rear exploded view of the level of FIG. 23.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
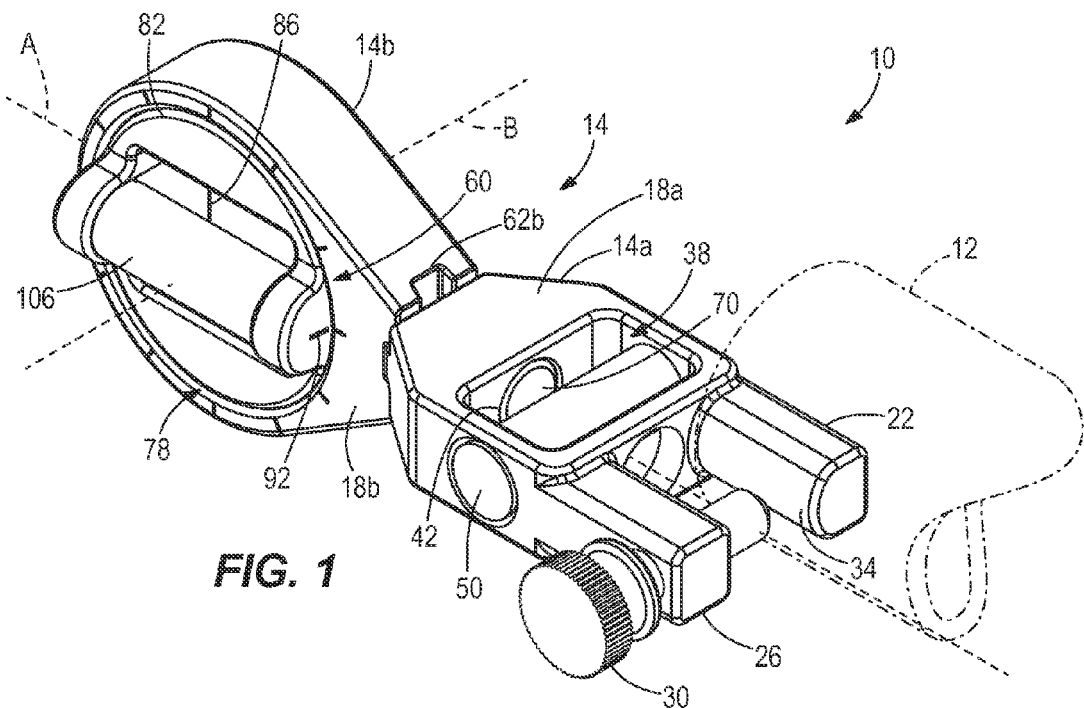
FIG. 1 is a perspective view of a level in a first orientation according to an embodiment of the invention.

FIG. 1 illustrates one embodiment of a level 10, similar to a no-dog level. The level 10 may be used in bending a work piece 12, such as a pipe, a conduit, flat bar stock, etc. The level 10 may have features similar to the features described and illustrated in U.S. Pat. No. 5,154,000, the entire contents of which is hereby incorporated by reference.

Figure 2:
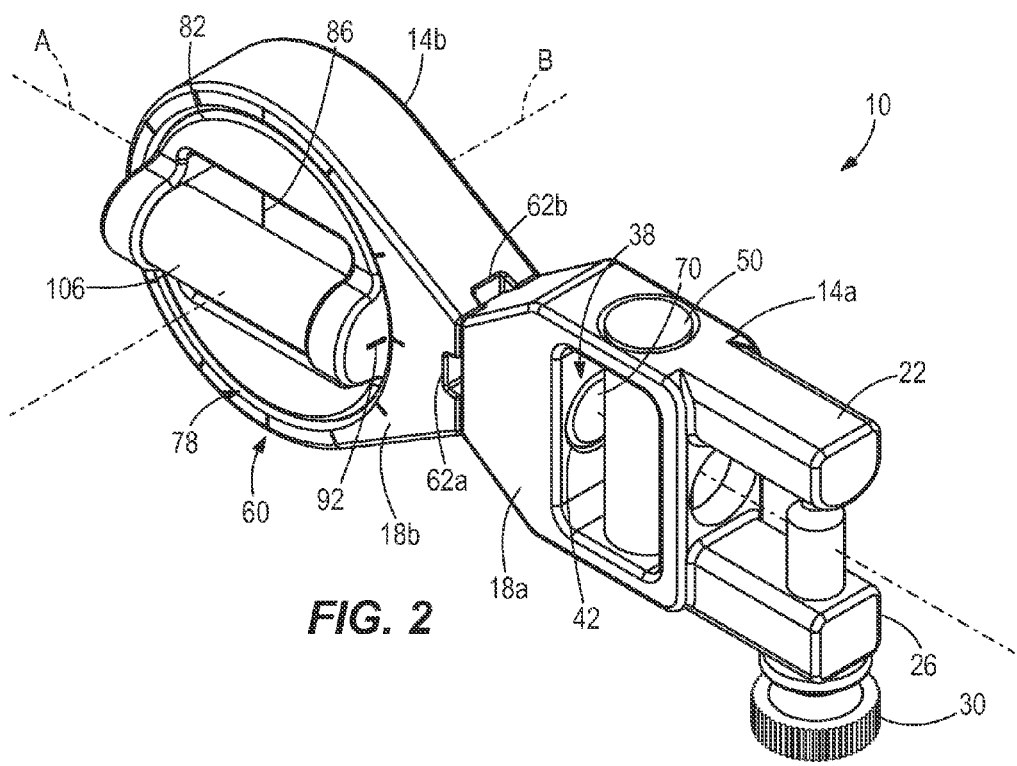
FIG. 2 is a perspective view of the level of FIG. 1 in a second orientation.

The illustrated level 10 includes a housing 14 having a base housing portion 14a with side surfaces 18a and a body housing portion 14b with side surfaces 18b. Each of the side surfaces 18 defines a side plane of the level 10. The base portion 14b is rotatable about the body portion 14b about a first axis A (FIGS. 1 and 2). A first leg 22 and a second leg 26 extend from the base portion 14a with a retaining member 30 extending through the second leg 26. In the illustrated embodiment, the legs 22, 26 are integral with the base portion 14a, and the illustrated first leg 22 includes a curved surface 34 configured to abut the work piece 12, e.g., an inner diameter of a conduit. The illustrated retaining member 30 is a threaded set screw oriented perpendicular to the second leg 26, e.g., orientated substantially parallel to the side surfaces 18. The retaining member 30 is also configured to abut the work piece 12, e.g., an outer diameter of a conduit. In the illustrated embodiment, the housing 14 is made of opaque material (e.g., metallic or plastic material), but in other embodiments, the housing 14 may be made of transparent or semi-transparent material.

The base portion 14a includes a cavity 38 and a central aperture 42 extending from the legs 22, 26 to a rib 46 (FIG. 4) located away from the legs 22, 26. The central aperture 42 defines a counterbore with a smaller diameter located adjacent the rib 46 and a larger diameter located adjacent the cavity 38.

With reference to FIGS. 1 and 2, a dog bubble vial 50 is supported within the cavity 38 and extends parallel to the side walls 18a. In one embodiment, the dog bubble vial 50 contains a first fluid and a second fluid generally immiscible in the first fluid. In another embodiment, the first fluid and/or the second fluid are a gas. The second fluid is configured to be located at a predetermined location in the dog bubble vial 50 indicating a first levelness of the level 10 relative to the direction of gravity. In other words, a levelness of the level 10 is an orientation (i.e., an angle) of the level 10 within a single plane relative to the direction of gravity.

Figure 3:
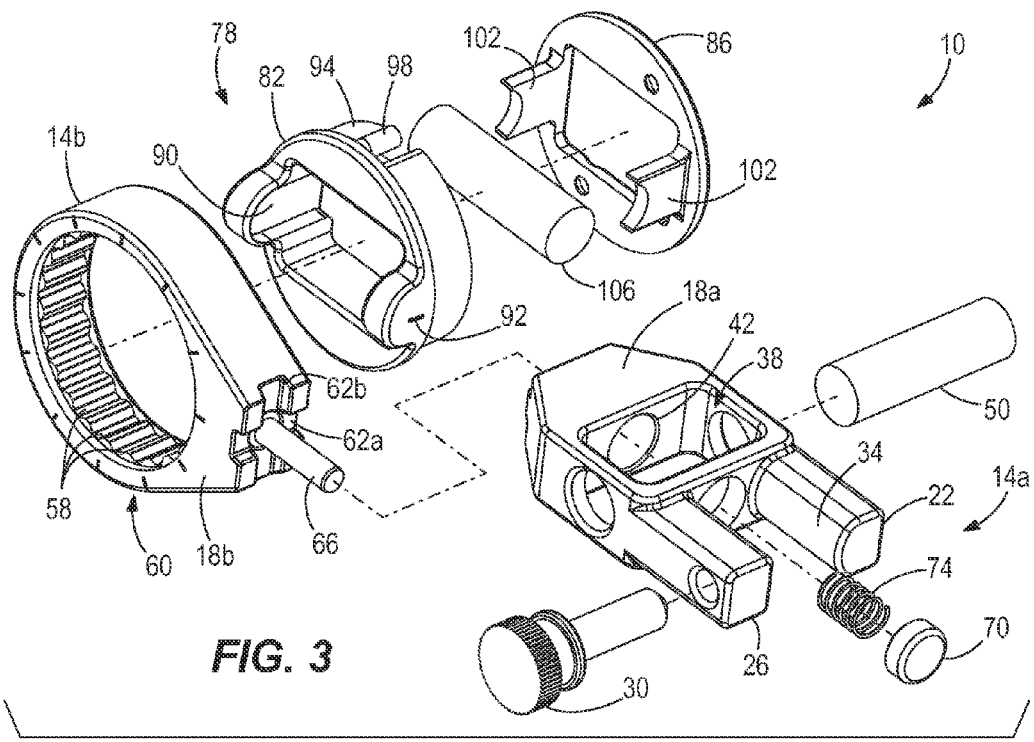
FIG. 3 is a front exploded view of the level of FIG. 1.
Figure 4:
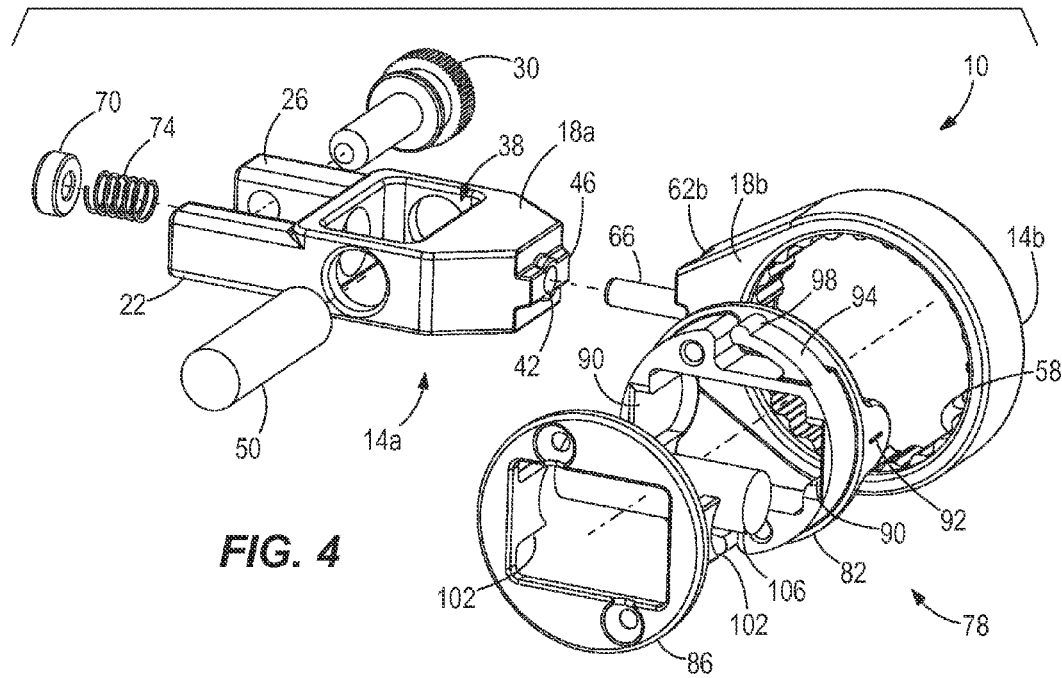
FIG. 4 is a rear exploded view of the level of FIG. 1.

FIGS. 3 and 4 illustrate the body portion 14b including a first slot 62a perpendicular to a second slot 62b, and the slots 62a, 62b are sized to engage the rib 46. In other embodiments, the base portion 14a may include the slots 62a, 62b, and the body portion 14b may include the rib 46. A protrusion 66 is located at an intersection between the slots 62a, 62b and is received within the central aperture 42. A stop 70 is attached to an end of the protrusion 66 and is sized to be received within the larger diameter of the central aperture 42, but not the smaller diameter of the central aperture 42. Therefore, the stop 70 limits axial movement between the base portion 14a and the body portion 14b along the first axis A. In the illustrated embodiment, a spring member 74, e.g., a compression coil spring, is positioned within the larger diameter of the central aperture 42 and is concentric with the protrusion 66 to bias the stop 70, and ultimately the body portion 14b, towards the base portion 14a.

Figure 5A:
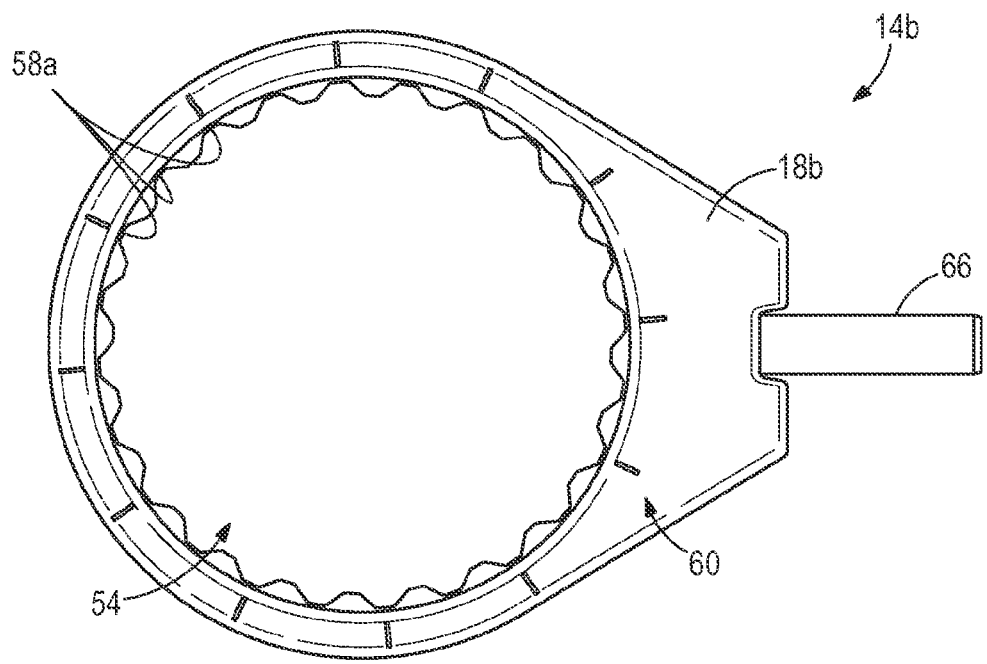
FIG. 5A is a side view of a housing portion of the level of FIG. 1 including grooves extending 360 degrees around an opening of the housing portion.
Figure 5B:
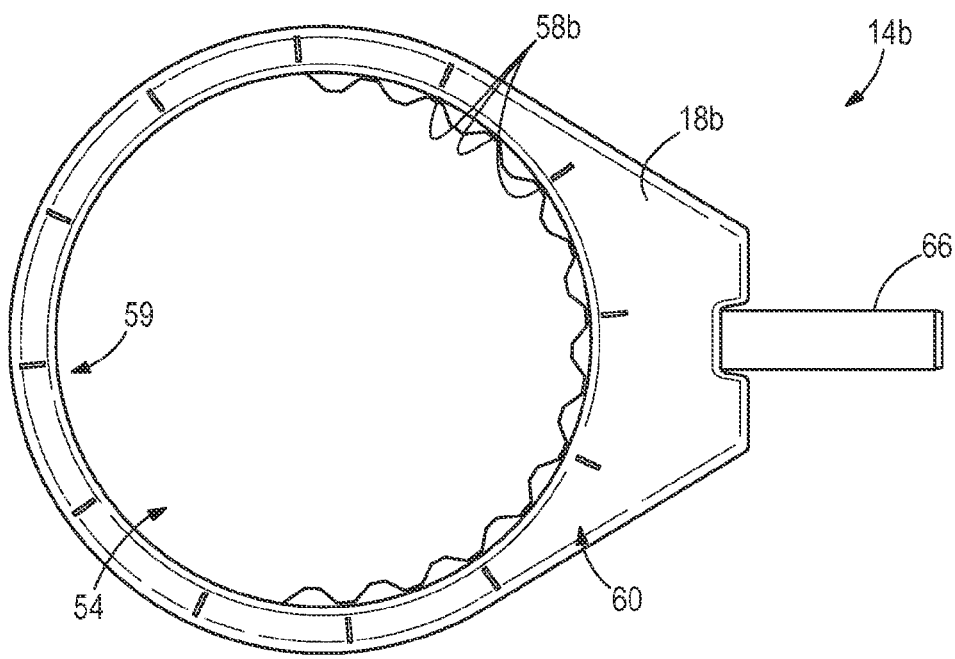
FIG. 5B is another embodiment of the housing portion of FIG. 5A including the grooves extending 180 degrees around the opening.

With reference to FIG. 5A, the body portion 14b also includes grooves 58a radially positioned 360 degrees within an opening 54 of the body portion 14b. In the illustrated embodiment, each groove 58a is radially spaced 15 degrees from an adjacent groove, e.g., the body portion 14b includes twenty-four grooves. In other embodiments, the grooves 58a may be spaced at a different degree (e.g., five, ten, etc. degrees) from each other. In another embodiment as illustrated in FIG. 5B, grooves 58b extend 180 degrees within the opening 54. In other words, an open region 59 defines a half of the opening 54, and the grooves 58b define the other half of the opening 54. Likewise to the grooves 58a, the grooves 58b are spaced 15 degrees apart, but the body portion 14b now includes twelve grooves. In other embodiments, the grooves 58b may be spaced at a different degree from each other. In further embodiments, the grooves 58 define two oppositely located quarter portions of the opening 54 with the open region 59 positioned between the two quarter portions. In other words, the opening 54 sequentially defines a first groove portion, a first open region, a second groove portion, and a second open region. In addition, indicia 60 align with the grooves 58 and are positioned on at least one side surface 18b of the body portion 14b. In the illustrated embodiment, the indicia 60 correspond to a desired tilt angle of the work piece 12, as discussed in detail below.

With reference to FIGS. 3 and 4, an annular housing 78 includes a front cover 82 and a rear cover 86 rotationally supported in an opening 54 of the housing 14 about the second axis B. The illustrated front cover 82 includes a central opening, e.g., a rectangular aperture, having guide recesses 90 oriented parallel to the second axis B. An indicator member 92 is positioned on an exterior surface of the front cover 82 and aligns with at least one of the guide recesses 90.

Figure 6A:
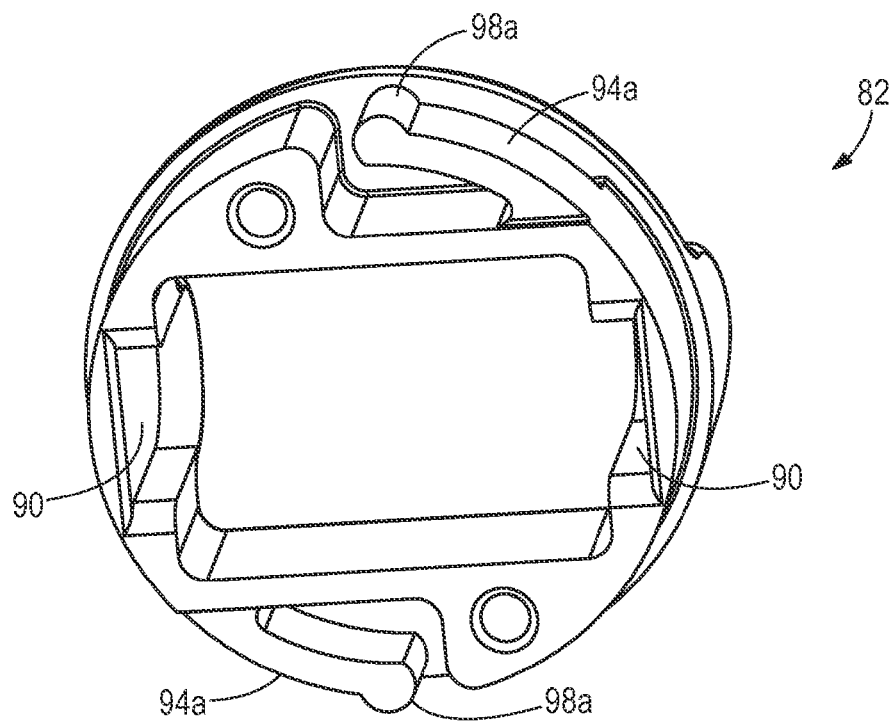
FIG. 6A is a side view of a front cover of the level of FIG. 1 including a plurality of resilient members.
Figure 6B:
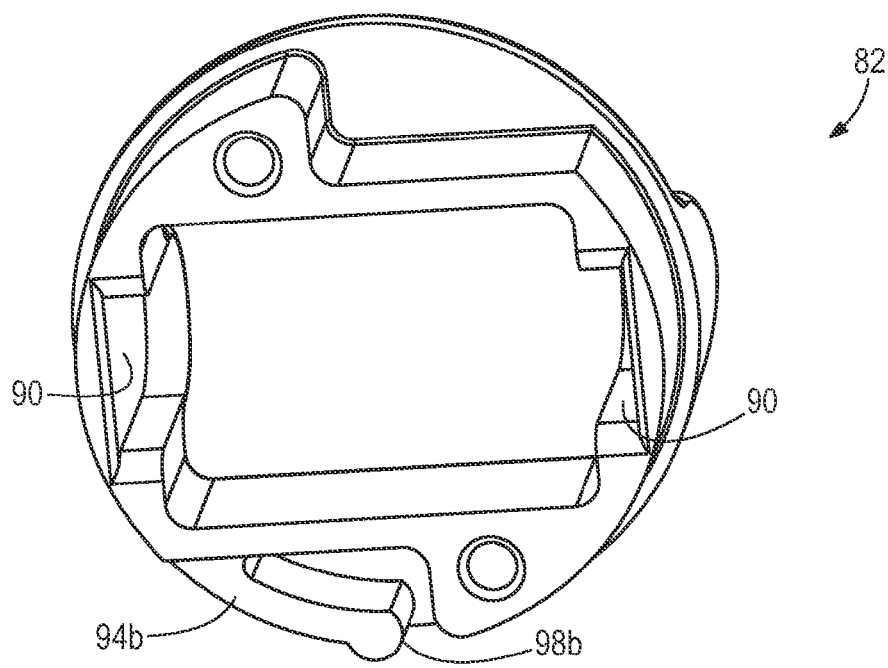
FIG. 6B is another embodiment of the front cover of FIG. 6A including a single resilient member.

With reference to FIG. 6A, resilient members 94a (e.g., resilient fingers) are located on a rear portion of the front cover 82 and are biased radially outward from the central opening away from the second axis B. The resilient members 94a include a projection 98a that is sized to engage one of the grooves 58a (FIG. 5A). In the illustrated embodiment, the front cover 82 includes two resilient members 94a; however, in other embodiments, the front cover 82 may include more or less than two resilient members. For example, FIG. 6B illustrates another embodiment of the front cover 82 including one resilient member 94b having a projection 98b that is sized to engage one of the grooves 58b (FIG. 5B). In other embodiments, the resilient member 94a, 94b may be located on the body portion 14b, and the grooves 58a, 58b may be located on the front cover 82.

The illustrated rear cover 86 also includes a central opening that aligns with the central opening of the front cover 82. Guide members 102 extend along the second axis B and are sized to be received within the guide recesses 90. Engagement between the guide members 102 and the guide recesses 90 enables co-rotation between the covers 82, 86.

A rotatable bubble vial 106 is affixed to the annular housing 78 for rotational movement therewith. In particular, the bubble vial 106 is held in position within the guide recesses 90 by the guide members 102 once the rear cover 86 is attached to the front cover 82 (via fasteners).

In operation, the level 10 is connected to the work piece 12 to be bent by positioning the work piece 12 between the legs 22, 26. By rotating the retaining member 30, the work piece 12 is secured between the curved surface 34 and the retaining member 30.

The base portion 14a and the body portion 14b may be oriented perpendicular (FIG. 1) or parallel (FIG. 2) to each other. Generally, the level 10 in the parallel orientation is suitable for storage and transportation, and the level 10 in the perpendicular orientation is used to bend the work piece 12 at a desired angle. To change the level 10 from the perpendicular orientation to the parallel orientation, the portions 14a, 14b are separated away from each other along the first axis A, which disengages the rib 46 from the first slot 62a. Simultaneously, the stop 70 moves towards the rib 46 and compresses the spring member 74. The body portion 14b is rotated relative to the base portion 14a such that the rib 46 now aligns with the second slot 62b. The body portion 14b is biased towards the base portion 14a for engagement between the rib 46 and the second slot 62b.

When the front cover 82 including the resilient members 94a is coupled to the body portion 14b including the grooves 58a (FIGS. 5A and 6A), the front cover 82 rotates relative to the body portion 14b such that the projections 98a selectively engage one of the grooves 58a to orientate the bubble vial 106 in a discrete angular position represented by alignment between the indicator member 92 and an indicium 60. Alternatively, when the front cover 82 including the resilient members 94b is coupled to the body portion 14b including the grooves 58b (FIGS. 5b and 6B), the bubble vial 106 can be positioned in a discrete angular position or the bubble vial 106 can be positioned in an angular position not provided by the grooves 58b. As the projection 98b engages one of the grooves 58b, the bubble vial 106 is positioned in a discrete angular position similar to the embodiment illustrated in FIGS. 5A and 6A. However, when the resilient member 94b is rotated into the open region 59, the bubble vial 106 can be positioned at any angle, e.g., between 0 degrees and 180 degrees. Because the resilient member 94b is biased outwardly, the projection 98b is biased into contact with the open region 59 to temporarily hold the bubble vial 106 in a desired position.

The dog bubble level 50 is operable to indicate whether a dog is occurring in the work piece 12. When the work piece 12 is being bent at a desired angle in a bending plane, the dog bubble vial 50 is oriented to indicate whether the bend is dogging or skewing out of the bending plane. In other words, the dog bubble level 50 is oriented perpendicular to the bending plane as the work piece 12 is being bent.

The desired angular position (e.g., tilt or bend angle) of work piece 12 is indicated by the rotatable bubble vial 106. As such, the bubble vial 106 is oriented parallel to the bending plane. To set a desired bend angle, the annular housing 78 is adjusted relative to the body portion 14b to align the indictor member 92, and ultimately the rotatable bubble vial 160, with the corresponding indicia 60. The work piece 12 is bent until the bubble level 106 is level indicating that the desired bend angle has been achieved. While bending, the dog bubble vial 50 is maintained level to ensure that the bend is not dogging or skewing out of the bending plane.

Figure 7:
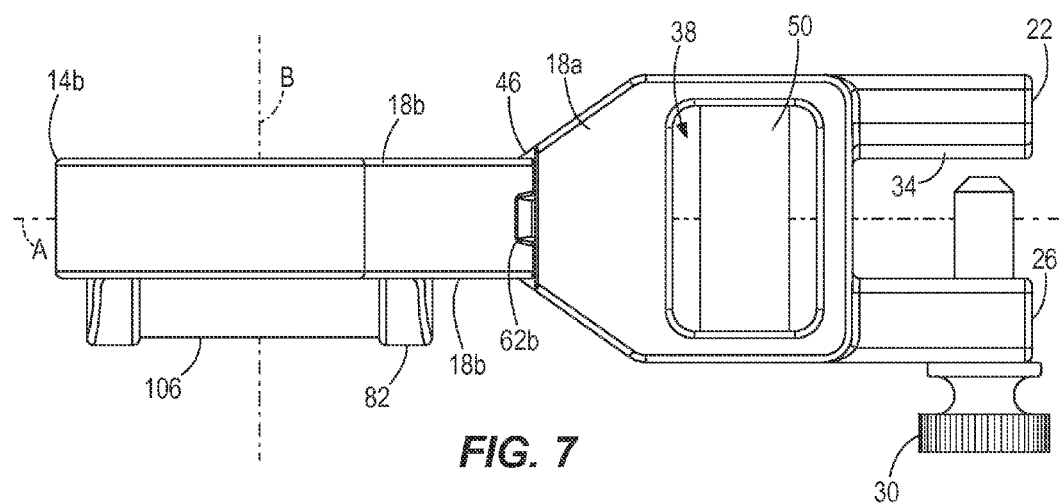
FIG. 7 is a top view of the level of FIG. 1 with a bubble vial partially extending from a side surface of the housing portion illustrated in FIG. 5A.

Furthermore, the bubble vials 50, 106 are both viewable as the work piece 12 is being bent. With reference to FIG. 7, the rotatable bubble vial 106 partially extends beyond the side surface 18b such that the rotatable bubble vial 106 is offset from the body portion 14b and viewable in a line of sight parallel to one of the side planes defined by the side surfaces 18b. The dog bubble vial 50 is also viewable from the line of sight parallel to the side surfaces 18b when the housing portions 14a, 14b are in the perpendicular orientation.

Figure 8:
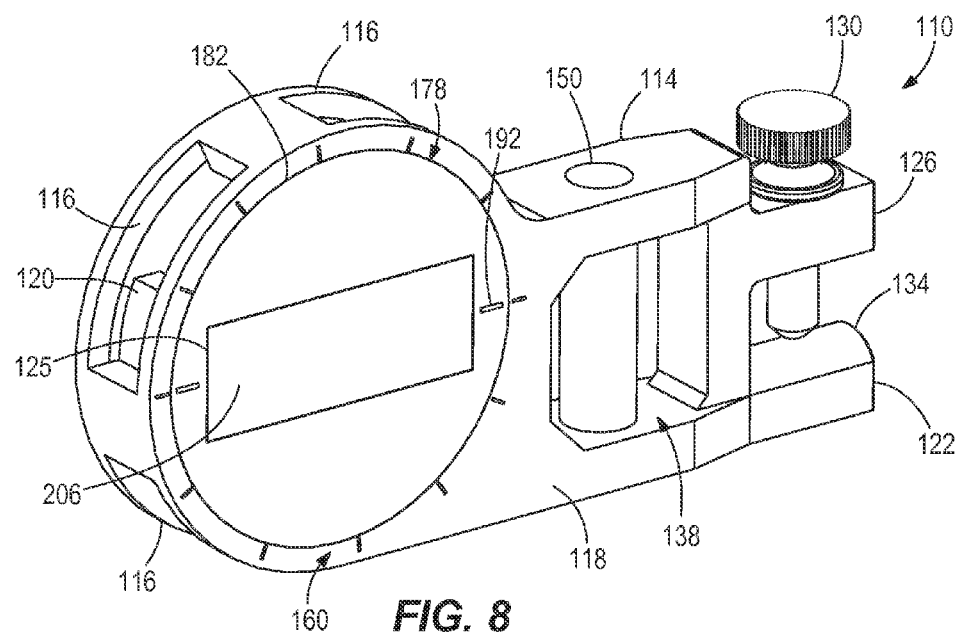
FIG. 8 is a perspective view of a level according to an embodiment of the invention.
Figure 9:
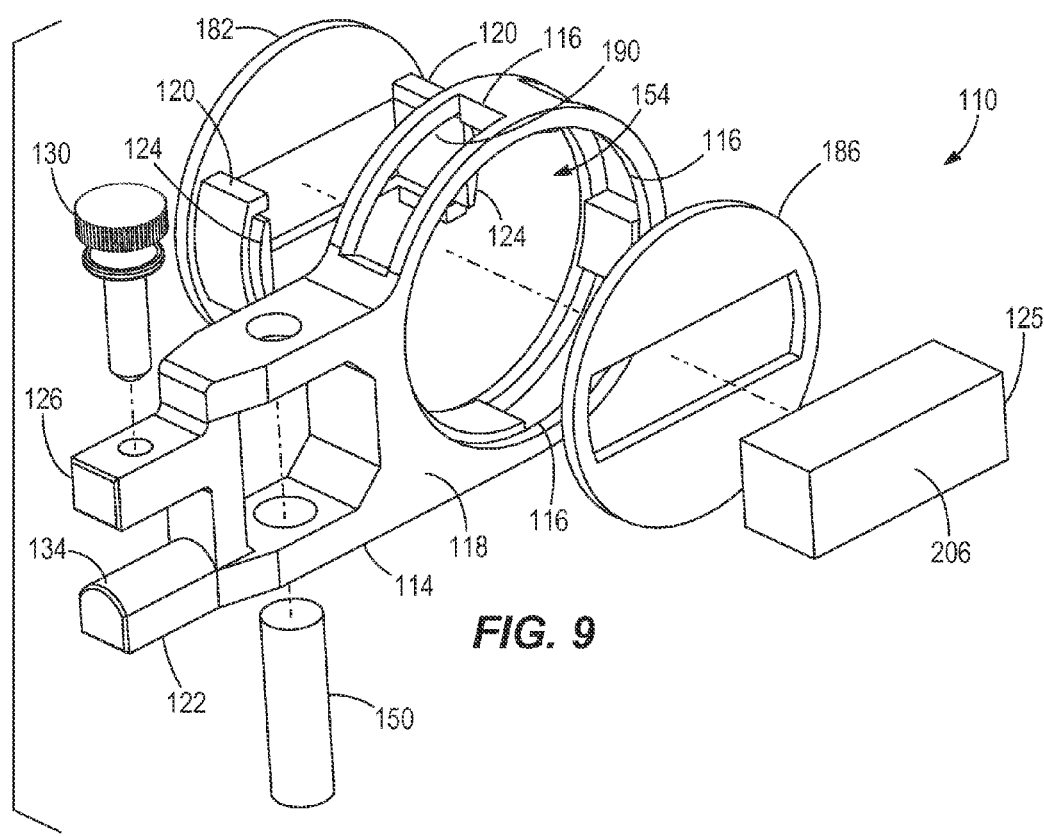
FIG. 9 is an exploded view of the level of FIG. 8.
Figure 10:
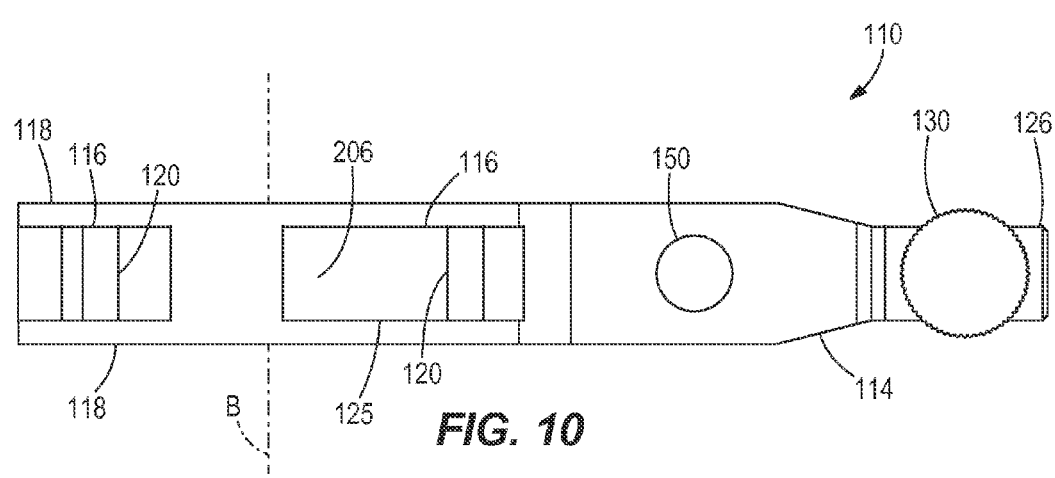
FIG. 10 is a top view of the level of FIG. 8.

FIGS. 8-10 illustrate a level 110 according to another embodiment. The level 110 is similar to the level 10; therefore, similar components have been given similar reference numbers, plus 100. Only differences between the levels 10, 110 will be discussed in detail. In addition, components or features described with respect to only one or some of the embodiments described herein are equally applicable to any other embodiments described herein.

The illustrated level 110 includes an integral housing 114 with side surfaces 118. The housing 114 includes a first leg 122 having a curved surface 134, a second leg 126, and a retaining member 130. The housing 114 also includes a cavity 138 that receives a dog bubble vial 150. The housing 114 further includes windows or openings 116 located between the side surfaces 118 and extending around an opening 154 of the housing 114. In the illustrated embodiment, the level 110 includes three windows 116 configured to allow visual access to the interior of the housing 114, e.g., within the opening 154. In other embodiments, there may be more or less than three windows 116.

The housing 114 receives an annular housing 178 with indicia 160 positioned around the opening 154 of the housing 114. The annular housing 178 includes a front cover 182 and a rear cover 186 rotationally supported in the opening 154 of the housing 114 about the second axis B. The illustrated covers 182, 186 may be transparent or opaque. In other embodiments, one of the covers may be transparent as the other cover may be opaque. The illustrated front cover 182 includes a central opening, e.g., a rectangular aperture, with guide arms 120 defining guide recesses 190 oriented parallel to the second axis B. The guide arms 120 and the guide recesses 190 protrude inwardly, e.g., towards the rear cover 186, from a front face of the front cover 182. Tabs 124 are positioned on the guide arms 120 away from the front face of the front cover 182. In addition, an indicator member 192 is positioned on an exterior surface of the front cover 182 and aligns with at least one of the guide recesses 190. In other embodiments, the indicator member 192 may be positioned anywhere on the exterior surface of the front cover 182.

The illustrated rear cover 186 includes a central opening that aligns with the central opening of the front cover 182. The tabs 124 of the front cover 182 are sized to engage the central opening of the rear cover 186. A rotatable bubble vial 206 is affixed within the guide recesses 190. In the illustrated embodiment, the bubble vial 206 includes a transparent protective casing 125 that is substantially flush or coextensive with an exterior surface of the covers 182, 186.

In operation, the annular housing 178 is rotated relative to the housing 114 to reach a desired tilt angle of the bubble vial 206. The bubble vial 206 temporarily remains at the desired tilt angle by interference between the guide arms 120 and a middle portion of the housing between the side surfaces 118. Stated another way, a frictional fit is provide between the housing 114 and the annular housing 178 such that the annular housing 178 is able to rotate relative to the housing 114 until a desired tilt angle is reached, thereby temporarily holding the annular housing 178 in position.

With reference to FIG. 10, the bubble vial 206 is viewable in a plane parallel to the side surfaces 118 through windows 116. The windows 116 may be positioned around the housing 114 such that the bubble vial 206 is viewable in other orientations, e.g., from a bottom of the level, a side of the level, etc.

Figure 11:
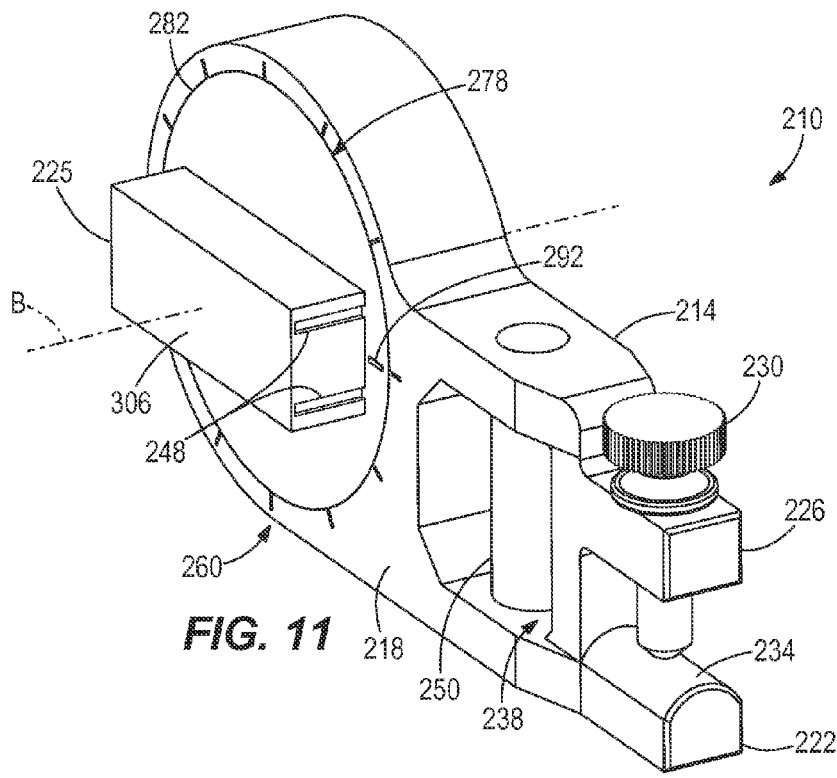
FIG. 11 is a perspective view of a level according to an embodiment of the invention.
Figure 12:
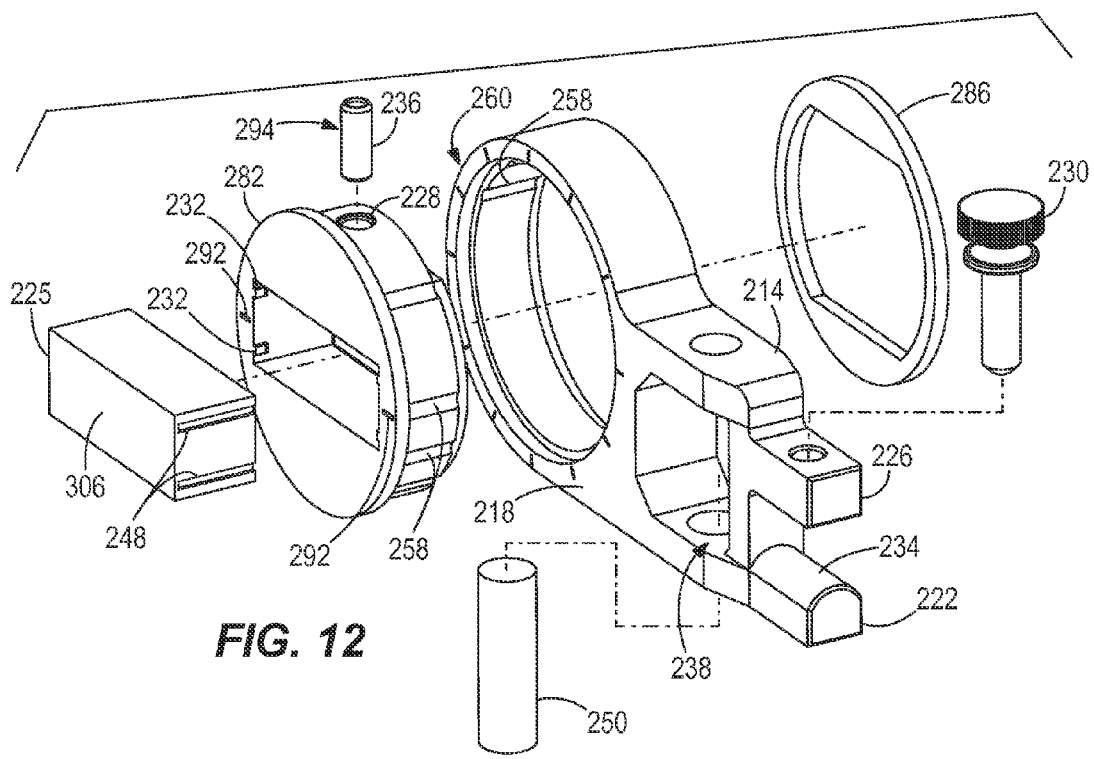
FIG. 12 is a front exploded view of the level of FIG. 11.
Figure 13:
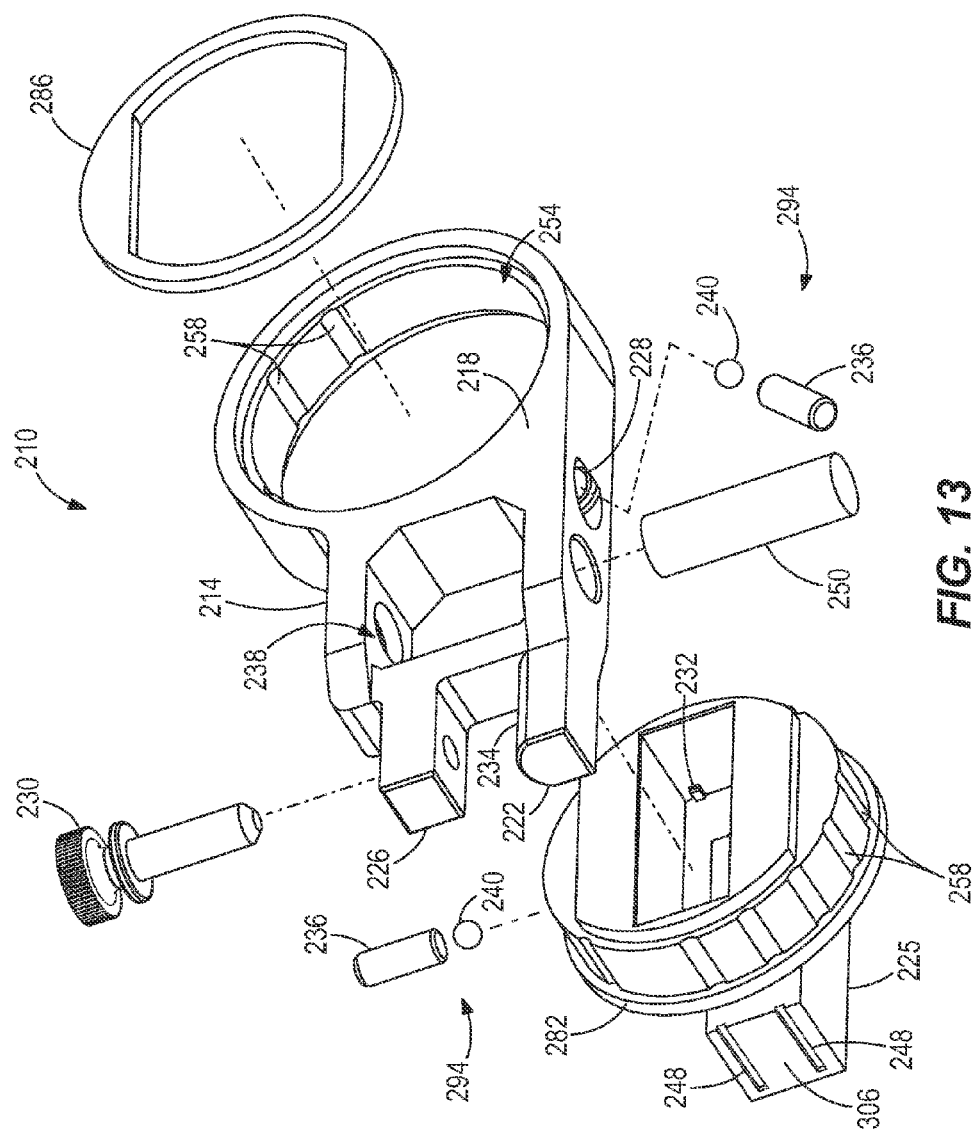
FIG. 13 is a rear exploded view of the level of FIG. 11.

FIGS. 11-13 illustrate a level 210 according to another embodiment. The level 210 is similar to the level 10; therefore, similar components have been given similar reference numbers, plus 200. Only differences between the levels 10, 210 will be discussed in detail. In addition, components or features described with respect to only one or some of the embodiments described herein are equally applicable to any other embodiments described herein.

The illustrated level 210 includes a housing 214 with side surfaces 218. The housing 214 includes a first leg 222 having a curved surface 234, a second leg 226, and a retaining member 230. The housing 214 also includes a cavity 238 that receives a dog bubble vial 250. The housing 214 further includes grooves 258 radially positioned within an opening 254 of the housing 214 and a detent aperture 228 extending through the housing 214 into the opening 254. Located within the detent aperture 228 is a resilient detent assembly 294. The illustrated resilient detent assembly 294 includes a detent housing 236 and a detent ball 240. The detent ball 240 is partially located outside of the detent housing 236, and the detent housing 236 biases the detent ball 240 towards the second axis B. In other embodiments, a spring may be located within the detent housing 236 to bias the detent ball 240 towards the second axis B. In further embodiments, the housing 214 may include more than one detent aperture 228 and resilient detent assembly 294.

The housing 214 receives an annular housing 278 with indicia 260 positioned around the opening 254 of the housing 214. The annular housing 278 includes a front cover 282 and a rear cover 286 rotationally supported on the opening 254 of the housing 214 about the second axis B. The illustrated front cover 282 includes an indicator member 292 and a central opening, e.g., a rectangular aperture, having stops 232 located adjacent an opening of the rectangular aperture. A circumference of the front cover 282 also includes grooves 258 and a detent aperture 228. Located within the detent aperture 228 is another resilient detent assembly 294. In other embodiments, one of the housing 214 and the annular housing 278 includes the resilient detent assembly 294 and the other includes the grooves 258. In further embodiments, the annular housing 278 may include more than one detent aperture 228 and resilient detent assembly 294.

The illustrated rear cover 286 includes a central opening that aligns with the central opening of the front cover 282. In particular, the rear cover 286 is recessed into the front cover 282 such a portion of the front cover 282 is flush or coextensive with the rear cover 286. A rotatable bubble vial 306 is affixed within the opening of the front cover 282. In the illustrated embodiment, the bubble vial 306 includes a protective casing 225 having channels 248 that are sized to engage the stops 232. As such, the protective casing 225, and ultimately the bubble vial 306, are slidable along the second axis B relative to annular housing 278 so that the bubble vial 306 is viewable in a plane parallel to the side surfaces 218. The engagement between the stops 232 and the channels 248 inhibit removal of the protective casing 225 from the annular housing 278.

As the annular housing 278 rotates about the second axis B, the detent balls 240 selectively engage a corresponding groove 258. As such, the annular housing 278, and ultimately the bubble vial 306, is located within a discrete angular position relative to the housing 214. Because the detent balls 240 are biased by the detent housing 236 out of the detent apertures 228, the annular housing 278 can be positionable relative to the housing 214 in an orientation not defined by the grooves 258.

Figure 14:
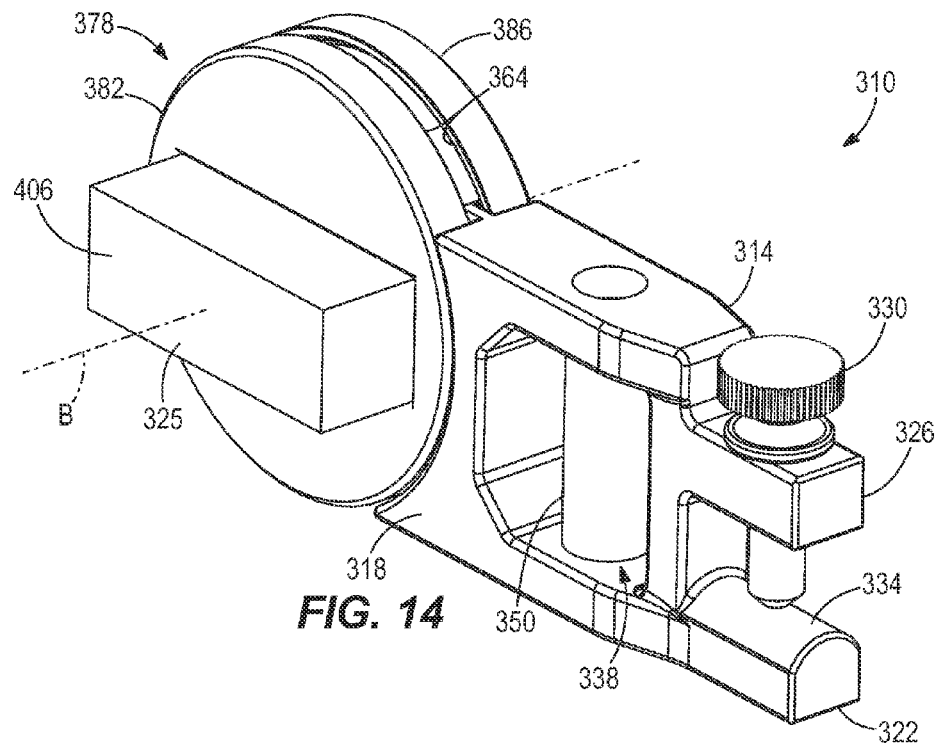
FIG. 14 is a perspective view of a level according to an embodiment of the invention.
Figure 15:
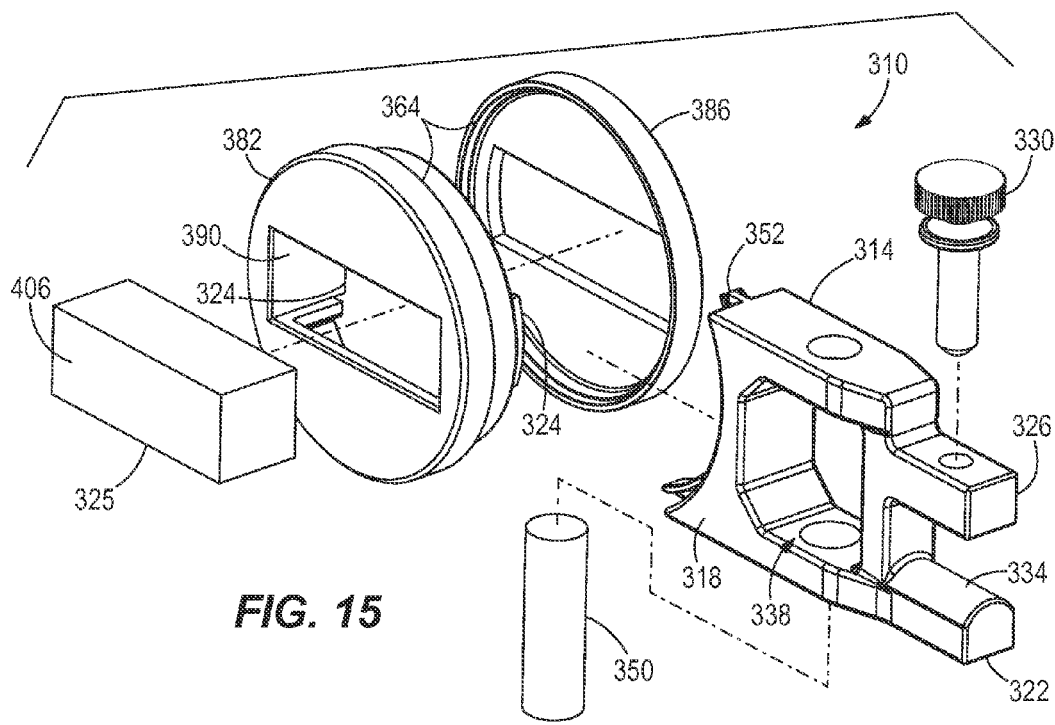
FIG. 15 is a front exploded view of the level of FIG. 14.
Figure 16:
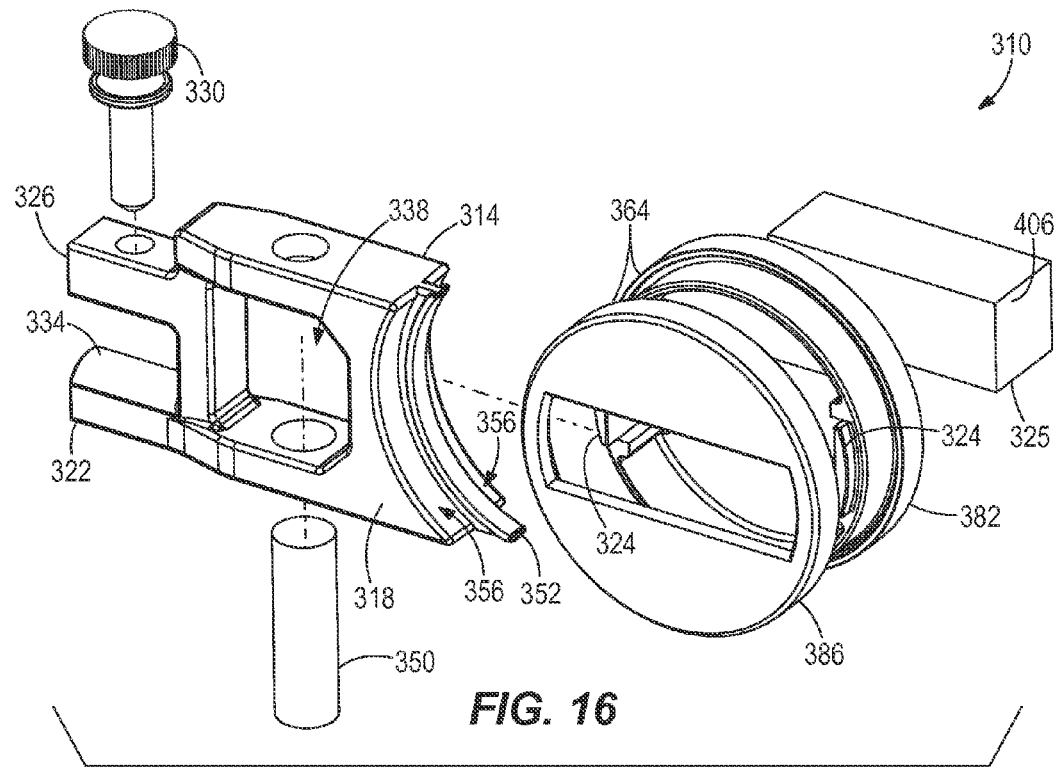
FIG. 16 is a rear exploded view of the level of FIG. 14.

FIGS. 14-16 illustrate a level 310 according to another embodiment. The level 310 is similar to the level 10; therefore, similar components have been given similar reference numbers, plus 300. Only differences between the levels 10, 310 will be discussed in detail. In addition, components or features described with respect to only one or some of the embodiments described herein are equally applicable to any other embodiments described herein.

The illustrated level 310 includes a housing 314 with side surfaces 318. The housing 314 includes a first leg 322 having a curved surface 334, a second leg 326, and a retaining member 330. The housing 314 also includes a cavity 338 that receives a dog bubble vial 350. A curved protrusion 352 extends from the housing 314 opposite the legs 322, 326 and defines channels 356. In other words, the curved protrusion 352 is T-shaped in cross section.

An annular housing 378 includes a front cover 382 and a rear cover 386 rotationally supported on the curved protrusion 352 about the second axis B. An edge 364 of the covers 382, 386 are received within a respective channel 356 facilitating rotation of the annular housing 378. The illustrated front cover 382 includes a central opening, e.g., a rectangular aperture, having guide recesses 390 and tabs 324 extending towards the rear cover 386.

The illustrated rear cover 386 includes a central opening that aligns with the central opening of the front cover 382. The tabs 324 of the front cover 382 are sized to engage the central opening of the rear cover 386. A rotatable bubble vial 406 is affixed within the guide recesses 390. In the illustrated embodiment, the bubble vial 406 is encapsulated within a transparent protective casing 325. In one embodiment, the protective casing 325 may slide relative to the annular housing 378, similar to the level 210. In other embodiments, the protective casing 325 may be fixed in position partially extending beyond one of the side surfaces 318.

Figure 17:
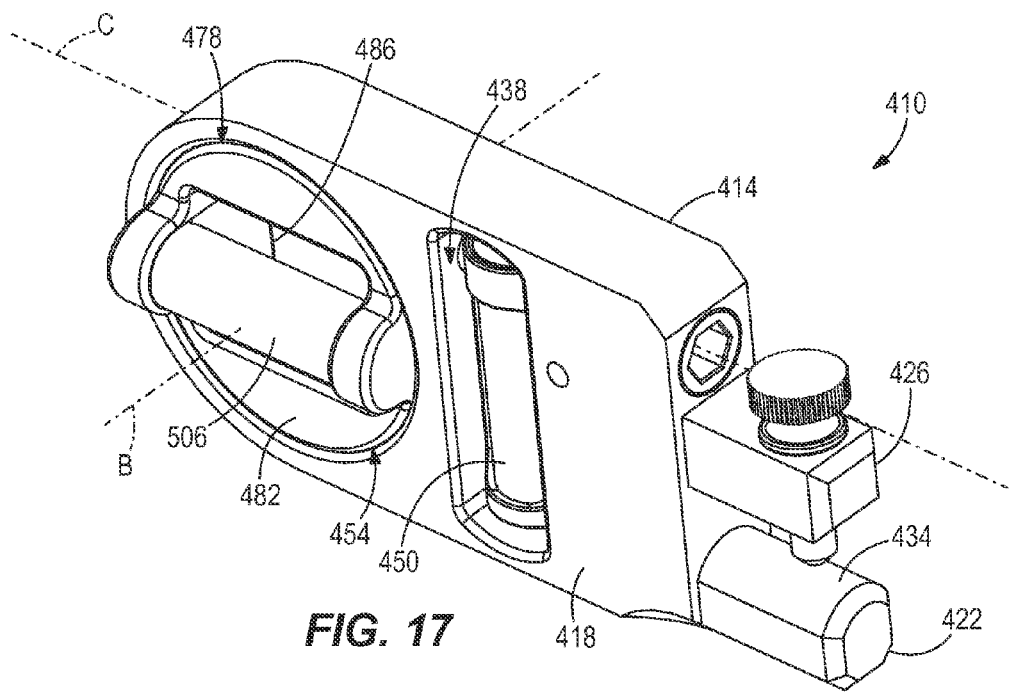
FIG. 17 is a perspective view of a level including a bubble vial in a first orientation according to an embodiment of the invention.
Figure 18:
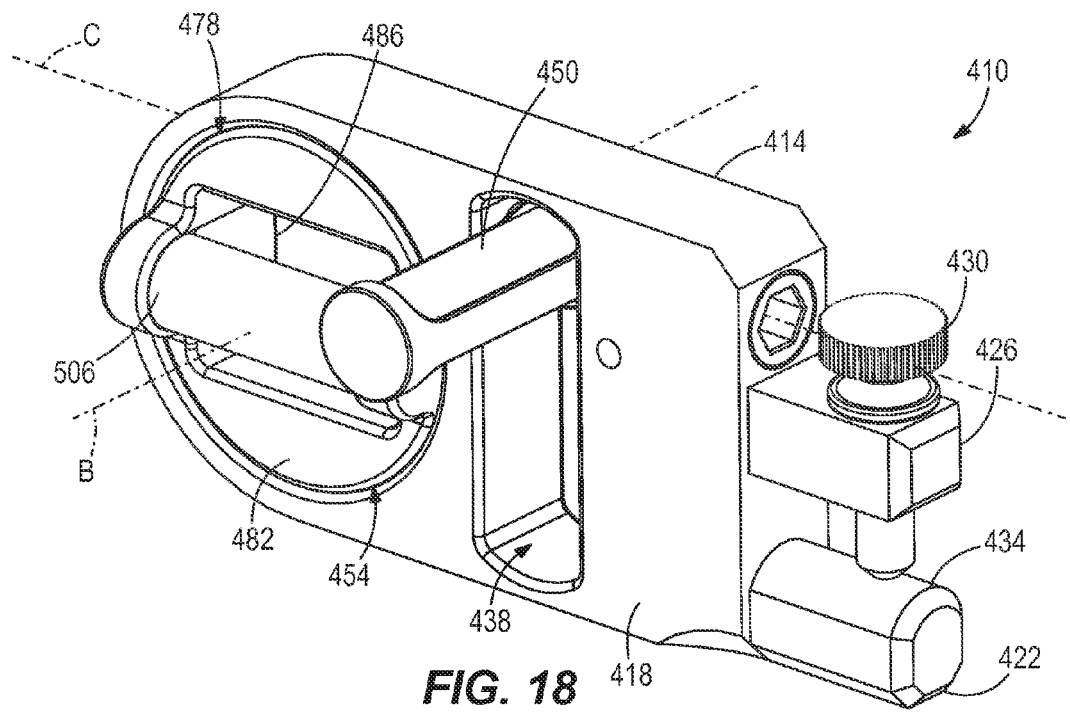
FIG. 18 is a perspective view of the level of FIG. 17 including the bubble vial in a second orientation.

FIGS. 17 and 18 illustrate a level 410 according to another embodiment. The level 410 is similar to the level 10; therefore, similar components have been given similar reference numbers, plus 400. Only differences between the levels 10, 410 will be discussed in detail. In addition, components or features described with respect to only one or some of the embodiments described herein are equally applicable to any other embodiments described herein.

The illustrated level 410 includes a housing 414 with side surfaces 418. The housing 414 includes a first leg 422 having a curved surface 434, a second leg 426, and a retaining member 430. The housing 414 also includes a cavity 438 that receives a dog bubble vial 450. The dog bubble vial 450 is pivotally coupled to the housing about a third axis C. As such, the dog bubble vial 450 can be oriented parallel to the side surfaces 418 (FIG. 17) and perpendicular to the side surfaces 418 (FIG. 18).

An annular housing 478 includes a front cover 482 and a rear cover 486 rotationally supported in an opening 454 of the housing 414 about the second axis B. The annular housing 478 is similar to the annular housing 78. In one embodiment, the level 410 may include indicia and an indicator member, similar to the previous embodiments described above.

Figure 19:
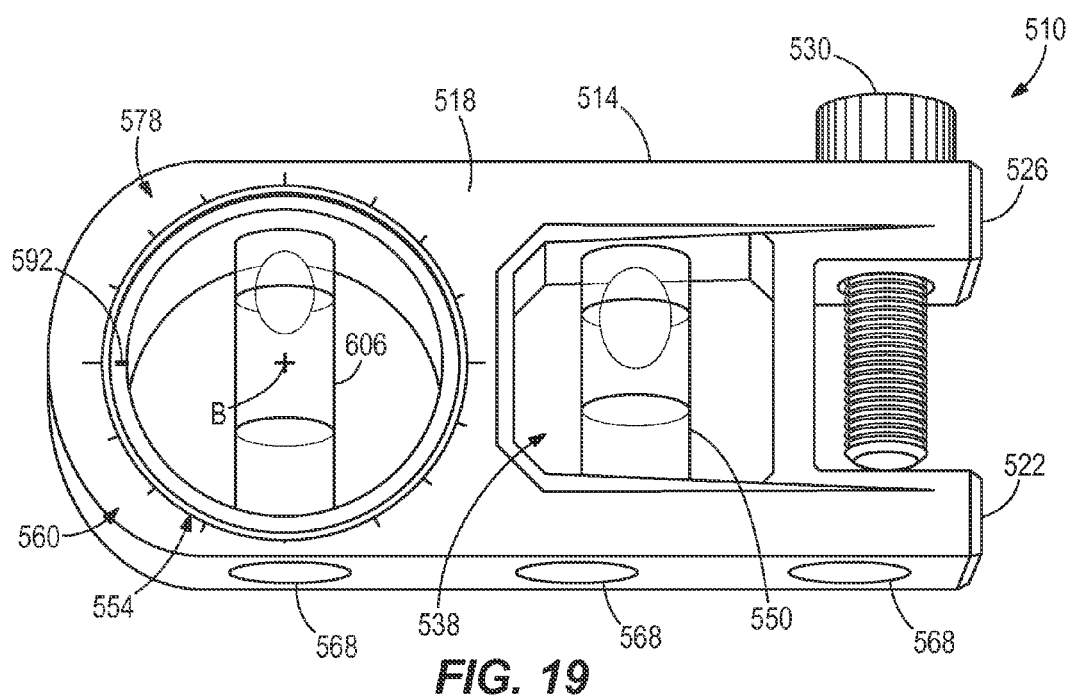
FIG. 19 is a perspective view of a level according to an embodiment of the invention.

FIG. 19 illustrates a level 510 according to another embodiment. The level 510 is similar to the level 10; therefore, similar components have been given similar reference numbers, plus 500. Only differences between the levels 10, 510 will be discussed in detail. In addition, components or features described with respect to only one or some of the embodiments described herein are equally applicable to any other embodiments described herein.

The illustrated level 510 includes a housing 514 with side surfaces 518. The housing 514 includes a first leg 522, a second leg 526, and a retaining member 530. The housing 514 also includes a cavity 538 that receives a dog bubble vial 550. Magnets 568 are attached to the housing 514 on a surface between the side surfaces 518. The magnets 568 are configured to attach the level 510 to a metallic work piece. In one embodiment, the level 510 includes three magnets; however, in other embodiments, level 510 may include more or less than three magnets. In further embodiments, the magnets 568 may be located at different locations on the housing 514.

An annular housing 578 is rotationally supported in an opening 554 of the housing 514 about the second axis B. The annular housing 578 supports a rotatable bubble vial 606. As the bubble vial 606 rotates relative to the housing 514, indicator member 592 selectively aligns with indicia 560.

Figure 20:
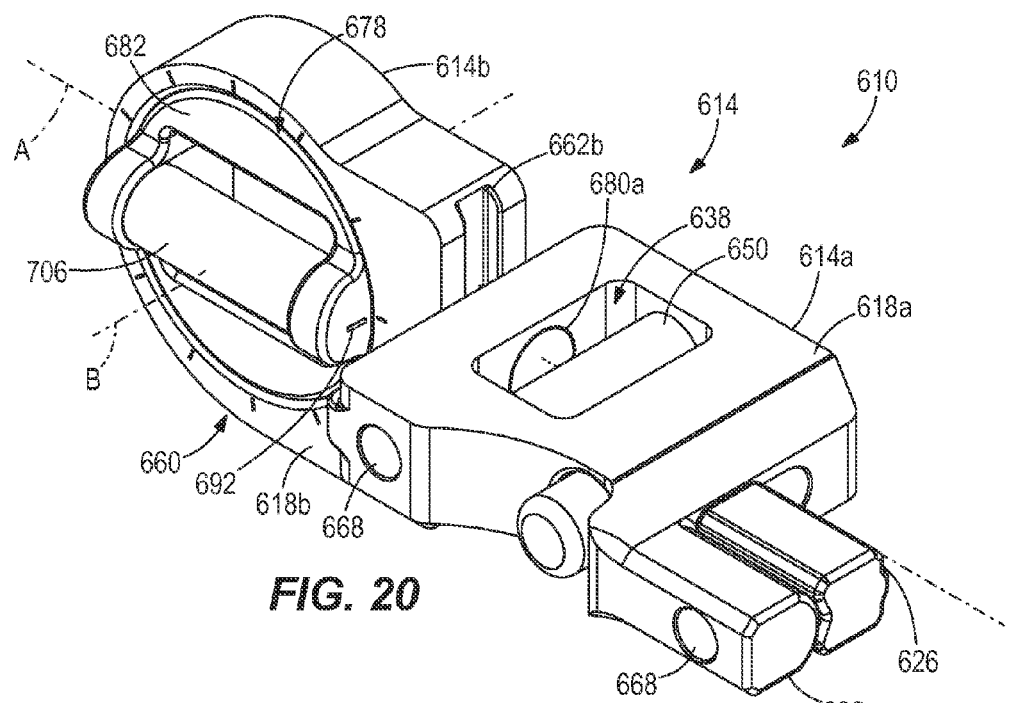
FIG. 20 is a perspective view of a level according to an embodiment of the invention.
Figure 21:
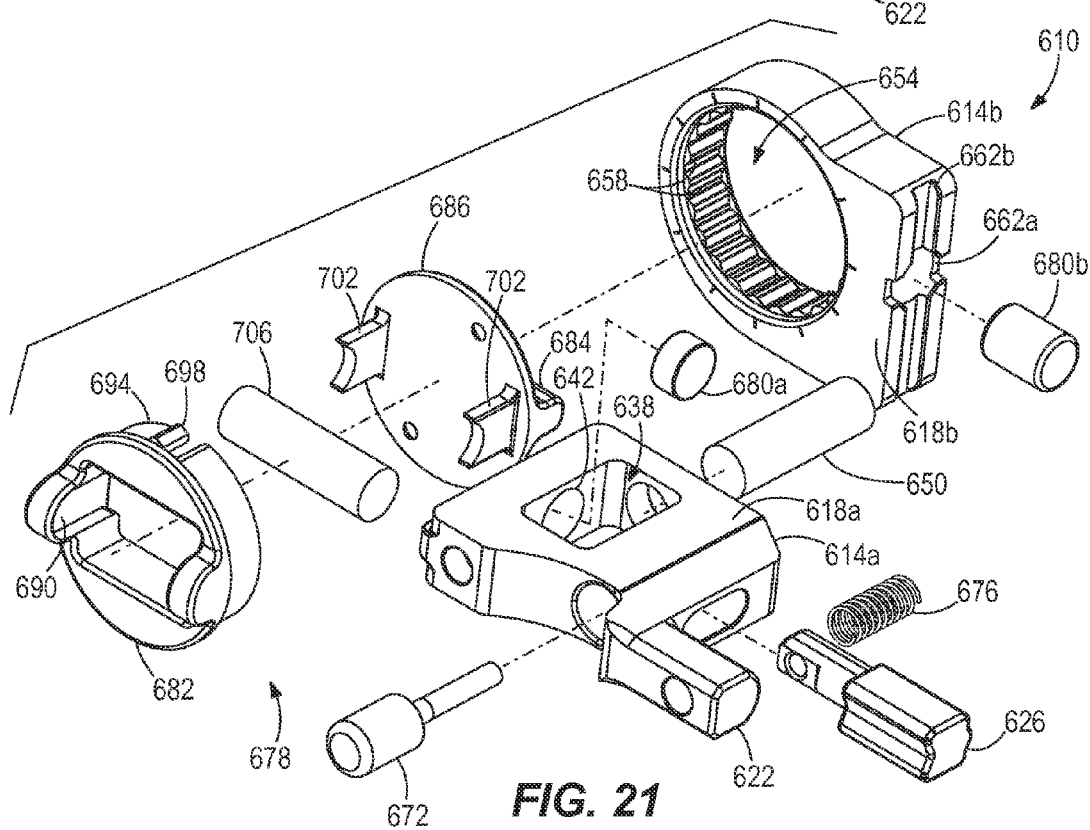
FIG. 21 is a front exploded view of the level of FIG. 20.
Figure 22:
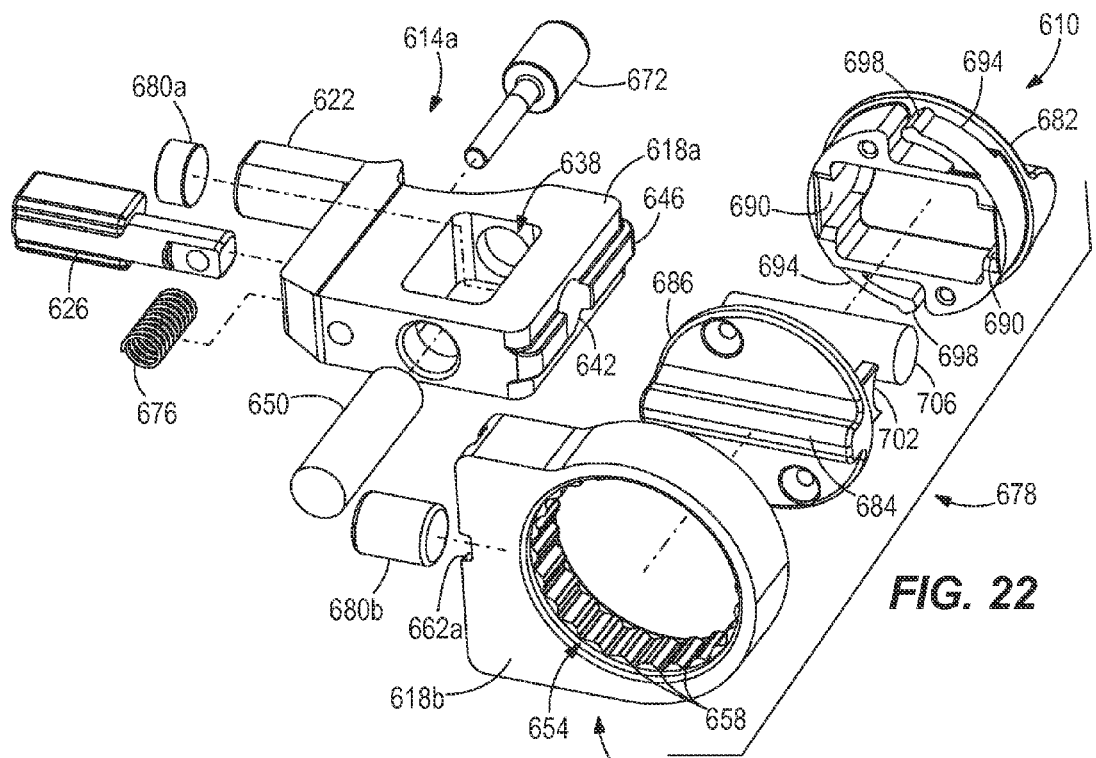
FIG. 22 is a rear exploded view of the level of FIG. 20.

FIGS. 20-22 illustrate a level 610 according to another embodiment. The level 610 is similar to the level 10; therefore, similar components have been given similar reference numbers, plus 600. Only differences between the levels 10, 610 will be discussed in detail. In addition, components or features described with respect to only one or some of the embodiments described herein are equally applicable to any other embodiments described herein.

The illustrated level 610 includes a housing 614 having a base housing portion 614a with side surfaces 618a and a body housing portion 614b with side surfaces 618b. The base portion 614b is rotatable about the body portion 614b about the first axis A. A fixed leg 622 and a moveable leg 626 extend from the base portion 614a. The moveable leg 626 moves relative to the fixed leg 622 against a biasing force of a spring 676 by an actuator 672. The actuator 672 abuts a portion of the moveable leg 626 located within the base portion 614a.

The base portion 614a also includes a cavity 638 and a central aperture 642 extending from the legs 622, 626 to a rib 646. The central aperture 642 defines a uniform diameter bore with a first magnet 680a received therein. A dog bubble vial 650 is supported within the cavity 638. In addition, the base portion 614a includes magnets 668, similar to the magnets 568 (FIG. 19).

The body portion 614b includes grooves 658, similar to the grooves 58a illustrated in FIG. 5A. In other embodiments, the body portion 614b may include grooves similar to the grooves 58b (FIG. 5B). In addition, indicia 660 align with the grooves 658. The body portion 14b further includes a first slot 662a perpendicular to a second slot 662b, and the slots 662a, 662b are sized to engage the rib 646. A second magnet 680b is received within an aperture located at the intersection between the slots 662a, 662b. The second magnet 680b is attracted to the first magnet 680a such that the magnets 680 enable engagement between the base portion 614a and the body portion 614b between a perpendicular orientation (FIG. 20) and a parallel orientation (similar to FIG. 2). In addition, the body portion 614b includes magnets 668.

An annular housing 678 includes a front cover 682 and a rear cover 686 rotationally supported in an opening 654 of the body portion 614b about the second axis B. The illustrated front cover 682 includes resilient members 694 each having a projection 698 and an indicator member 692 and is similar to the front cover 82, and the illustrated rear cover 686 is similar to the rear cover 86. The rear cover 686 further includes a knob 684 located opposite from guide members 702. The knob 684 is operable to rotate the annular housing 678 relative to the housing 614. A rotatable bubble vial 706 is secured within guide recesses 690 by the guide members 702.

Figure 23:
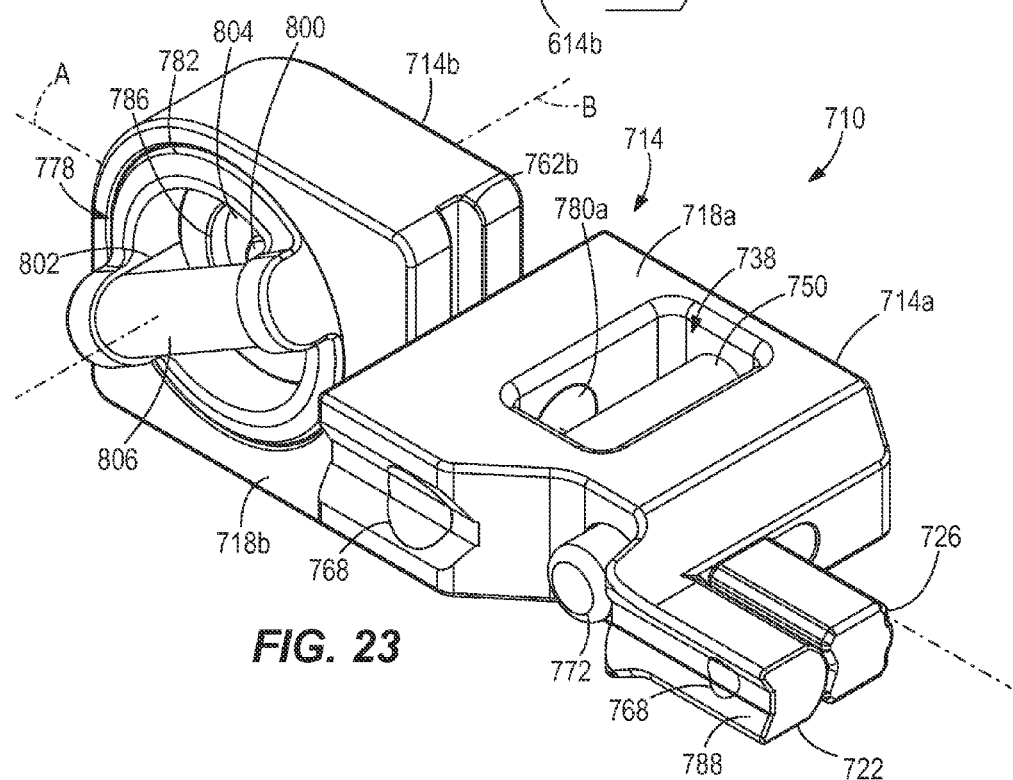
FIG. 23 is a perspective view of a level according to an embodiment of the invention.

FIGS. 23-25 illustrate a level 710 according to another embodiment. The level 710 is similar to the level 10; therefore, similar components have been given similar reference numbers, plus 700. Only differences between the levels 10, 710 will be discussed in detail. In addition, components or features described with respect to only one or some of the embodiments described herein are equally applicable to any other embodiments described herein.

The illustrated level 710 includes a housing 714 having a base housing portion 714a with side surfaces 718a and a body housing portion 714b with side surfaces 718b. The base portion 714b is rotatable about the body portion 714b about the first axis A. The portions 714a, 714b define a channel 788 that locates magnets 768—similar to magnets 568. The channel 788 is configured to abut a portion of the work piece 12, e.g., an outer diameter of a conduit. A fixed leg 722 and a moveable leg 726 extend from the base portion 714a. The moveable leg 726 moves relative to the fix leg 722 by an actuator 772. The actuator 772 abuts a portion of the moveable leg 726 against a biasing force of a spring 776.

The base portion 714a also includes a cavity 738 and a central aperture 742 extending from the legs 722, 726 to a rib 746. The central aperture 742 defines a uniform diameter bore with a first magnet 780a received therein. A dog bubble vial 750 is supported within the cavity 738.

The body portion 714b includes grooves 758 oriented parallel to the side surfaces 718b and directed towards the second axis B. The body portion 714b further includes a first slot 762a perpendicular to a second slot 762b, and the slots 762a, 762b are sized to engage the rib 746. A second magnet 780b is received within an aperture located at the intersection between the slots 762a, 762b. The second magnet 780b is attracted to the first magnet 780a.

An annular housing 778 includes a front cover 782 having guide recesses 790 and a rear cover 786 having guide members 802 rotationally supported in an opening 754 of the body portion 714b about the second axis B by a plug 800. The illustrated rear cover 786 also includes grooves 796 located on a rear surface opposite from the guide members 802 that are sized to engage the grooves 758. The illustrated plug 800 extends through central apertures of the body portion 714b and the rear cover 786 such that a washer 804 and a leaf spring 808 are positioned between a head of the plug 800 and the rear cover 786. The leaf spring 808 is configured to bias the grooves 796 of the rear cover 786 towards the grooves 758 of the body portion 714b. A rotatable bubble vial 806 is secured within guide recesses 790 by the guide members 802.

Figure 26:
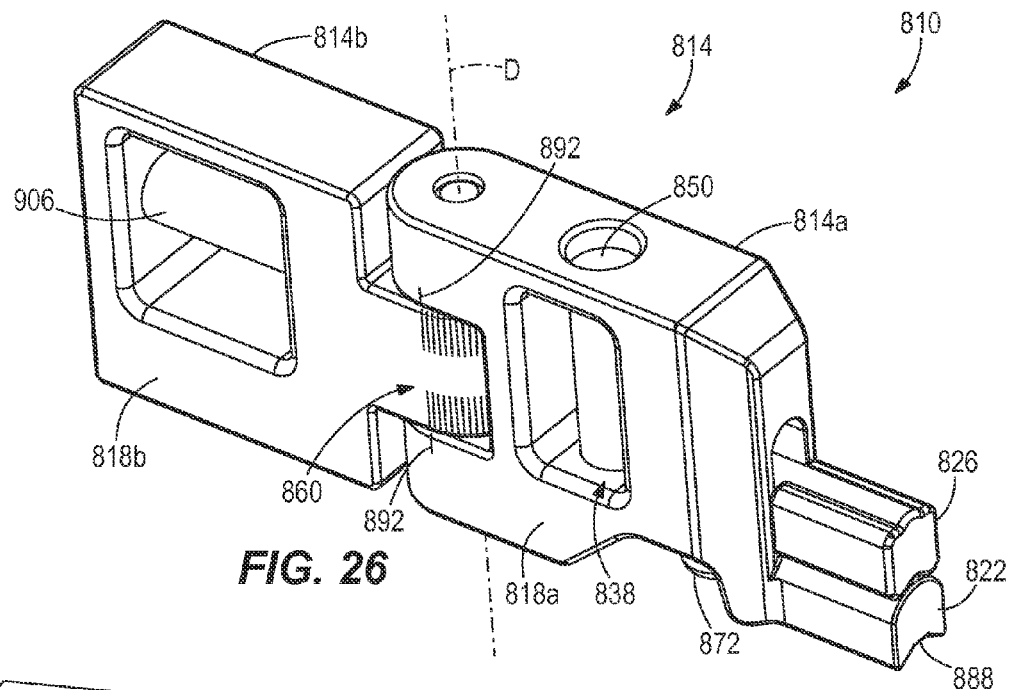
FIG. 26 is a perspective view of a level according to an embodiment of the invention.
Figure 27:
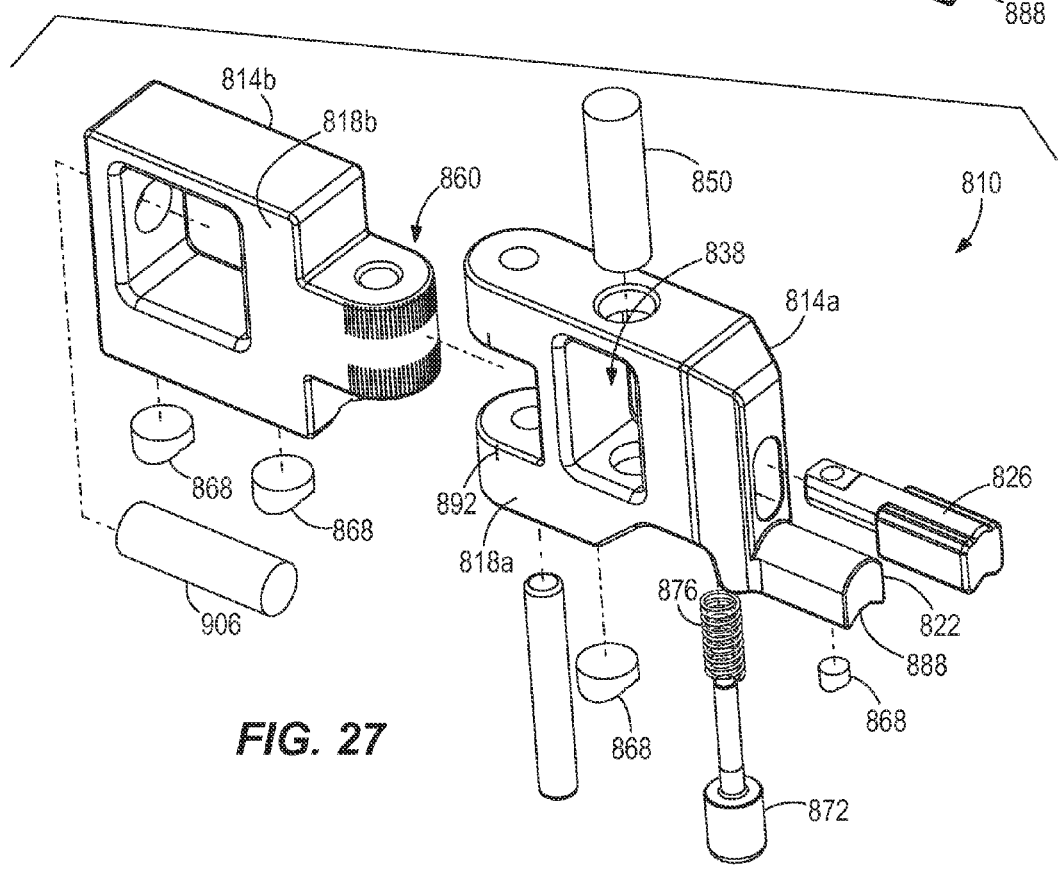
FIG. 27 is an exploded view of the level of FIG. 26.

FIGS. 26 and 27 illustrate a level 810 according to another embodiment. The level 810 is similar to the level 10; therefore, similar components have been given similar reference numbers, plus 800. Only differences between the levels 10, 810 will be discussed in detail. In addition, components or features described with respect to only one or some of the embodiments described herein are equally applicable to any other embodiments described herein.

The illustrated level 810 includes a housing 814 having a base housing portion 814a with side surfaces 818a and a body housing portion 814b with side surfaces 818b. The base portion 814b is rotatable about the body portion 814b about a fourth axis D defined by a pin. The portions 814a, 814b define a channel 888 that locates magnets 868—similar to the magnets 568. A fixed leg 822 and a moveable leg 826 extend from the base portion 814a. The moveable leg 826 moves relative to the fix leg 822 by an actuator 872. The actuator 872 abuts a portion of the moveable leg 826 against a biasing force of a spring 876.

The base portion 814a also includes a cavity 838 supporting a dog bubble vial 850. The dog bubble vial 850 is parallel to the fourth axis D. Indicator members 892 are located on the base portion 814a and align with the fourth axis D. The body portion 814*b* includes indicia 860 and supports a second bubble vial 906.

Figure 28:
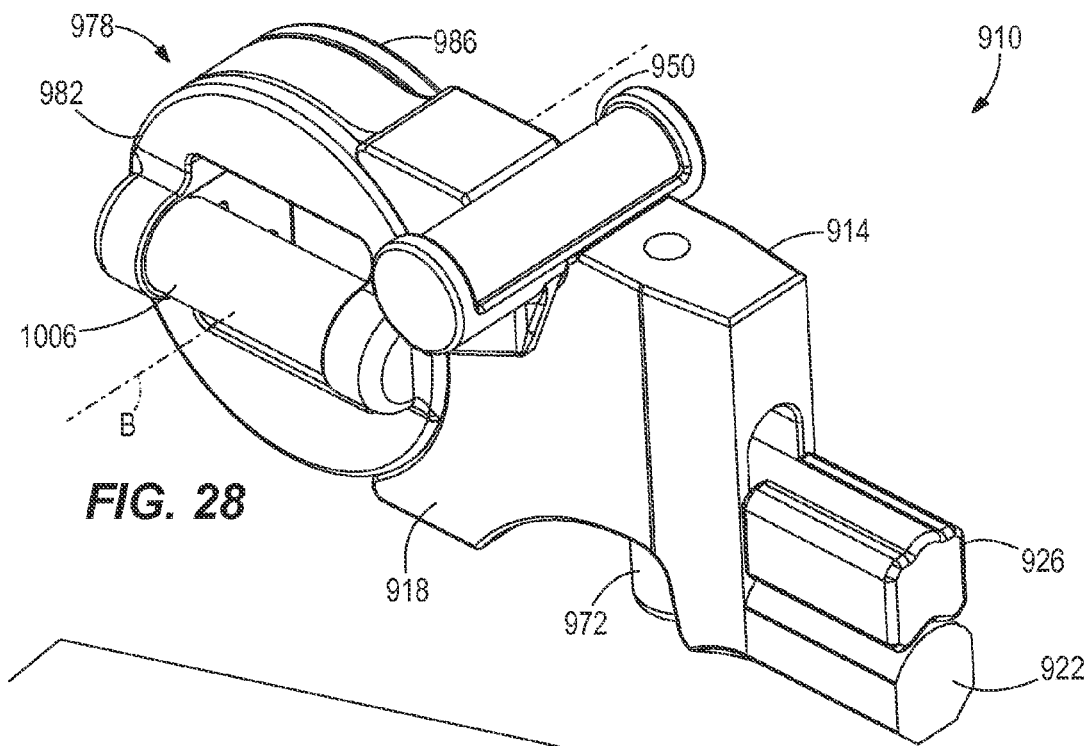
FIG. 28 is a perspective view of a level according to an embodiment of the invention.
Figure 29:
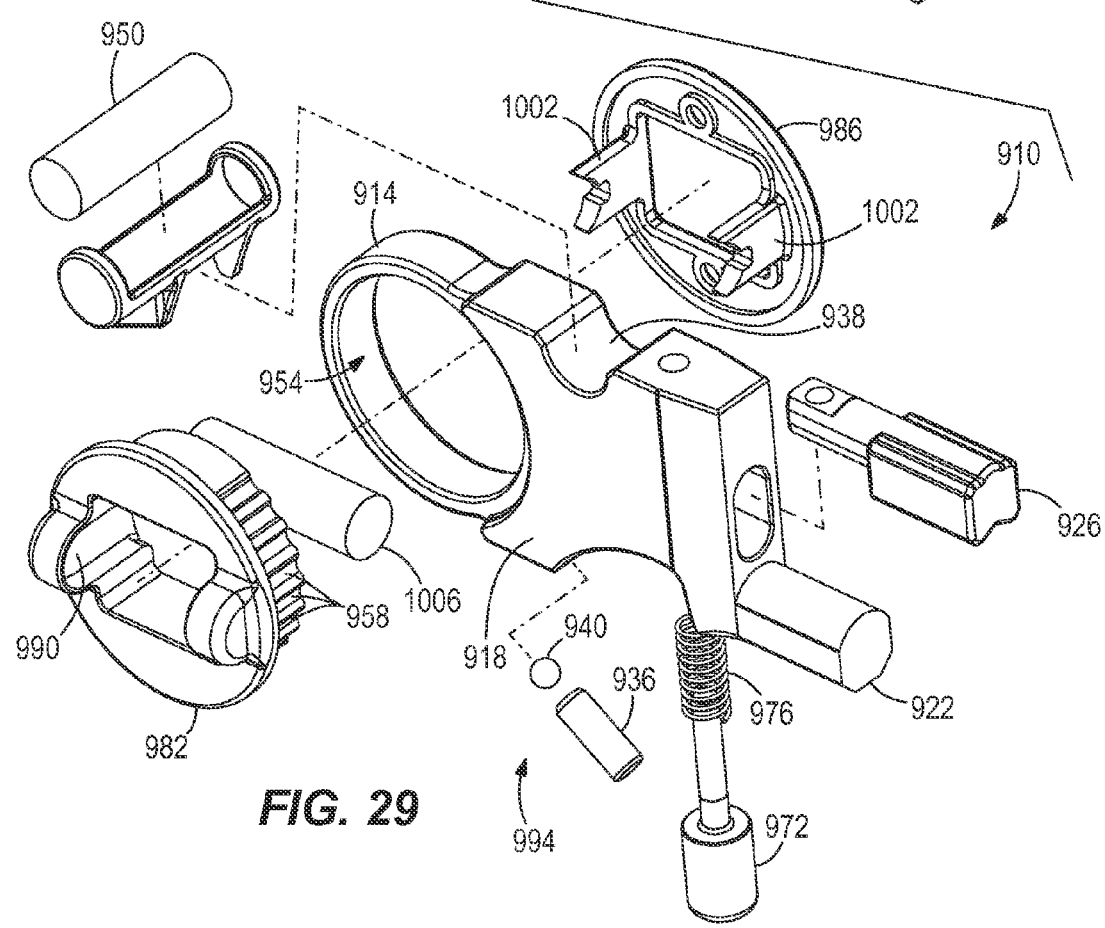
FIG. 29 is an exploded view of the level of FIG. 28.

FIGS. 28 and 29 illustrate a level 910 according to another embodiment. The level 910 is similar to the level 10; therefore, similar components have been given similar reference numbers, plus 900. Only differences between the levels 10, 910 will be discussed in detail. In addition, components or features described with respect to only one or some of the embodiments described herein are equally applicable to any other embodiments described herein.

The illustrated level 910 includes a housing 914 with side surfaces 918. A fixed leg 922 and a moveable leg 926 extend from the housing 914. The moveable leg 926 moves relative to the fix leg 922 by an actuator 972. The actuator 972 abuts a portion of the moveable leg 926 against a biasing force of a spring 976. The housing 914 also includes a dog bubble vial 950 received within a cavity 938 oriented perpendicular to the direction of movement of the leg 926. In one embodiment, the dog bubble vial 950 may be removable from the cavity 938. In other embodiments, the dog bubble vial 950 may be fixed relative to the cavity 938. A detent aperture 928 extends through the housing 914 into an opening 954 of the housing 914. Located within the detent aperture 928 is a resilient detent assembly 994 including a detent housing 936 and a detent ball 940, similar to the resilient detent assembly 294.

An annular housing 978 includes a front cover 982 and a rear cover 986 rotationally supported in the opening 954 of the housing 914 about the second axis B. In the illustrated embodiment, the dog bubble vial 950 and the second axis B are parallel. The illustrated front cover 982 includes a central opening, e.g., a rectangular aperture, having guide recesses 990. Grooves 958 extend 180 degrees around a circumference of the front cover 982.

The illustrated rear cover 986 includes a central opening that aligns with the central opening of the front cover 982. Guide members 1002 are received within the guide recesses 990 to position a rotatable bubble vial 1006 within the annular housing 978 for co-rotation therewith.

Figure 30:
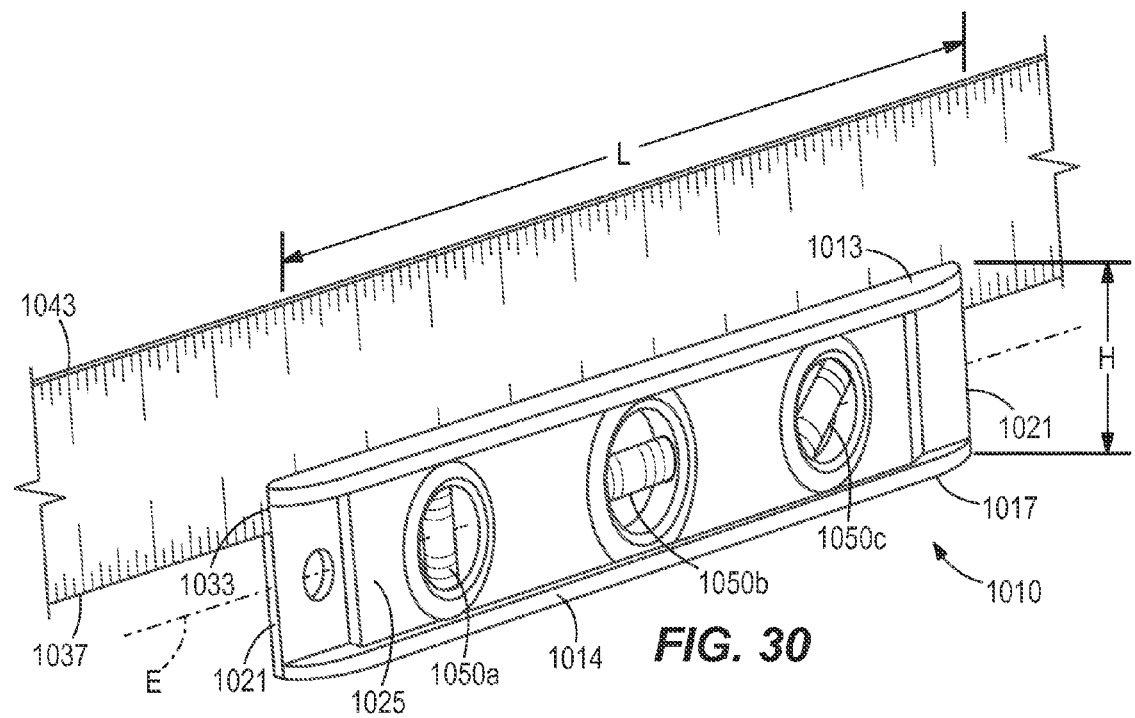
FIG. 30 is a perspective view of a level coupled to a ruler according to an embodiment of the invention.
Figure 31:
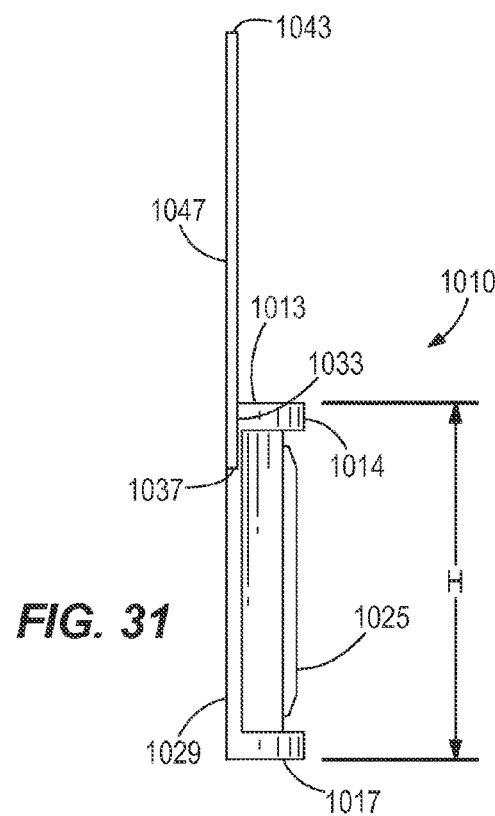
FIG. 31 is a side view of the level coupled to the ruler of FIG. 30.

FIGS. 30 and 31 illustrate a level 1010 according to another embodiment. The level 1010 is similar to the level 10; therefore, similar components have been given similar reference numbers, plus 1000. Only differences between the levels 10, 1010 will be discussed in detail. Components or features described with respect to only one or some of the embodiments described herein are equally applicable to any other embodiments described herein.

The illustrated level 1010, such as a torpedo level, includes a housing 1014 having a top planar surface 1013, a parallel bottom planar surface 1017, side surfaces 1021 located between the planar surfaces 1013, 1017 and perpendicular thereto, and a front surface 1025 opposite from a rear surface 1029. The illustrated housing 1014 includes a length L that is substantially greater than a height H such that the level 1010 defines a longitudinal axis E. In the illustrated embodiment, a recess 1033 extends the length of the top planar surface 1013 and is sized to receive an edge 1037 of a tool 1043 (e.g., a ruler), wherein the ruler 1043 is substantially longer than the length L of the level 1010. In other embodiments, the recess 1033 may be located on both planar surfaces 1013, 1017, and/or the recess 1033 may be located on at least one of the side surfaces 1021. The engagement between the recess 1033 and the ruler 1043 provides a coextensive or coplanar surface between a side 1047 of the ruler 1043 and the rear surface 1029. In other embodiments, the recess 1033 may be constructed to abut both sides of the ruler 1043 to form a channel around the edge 1037 of the ruler 1043.

The housing 1014 supports a plurality of bubble vials 1050. In the illustrated embodiment, one bubble vial 1050*a* is oriented perpendicular to the planar surfaces 1013, 1017, one bubble vial 1050*b* is oriented parallel to the planar surfaces 1013, 1017, and one bubble vial 1050*c* is oriented at a 45 degree angle relative to the planar surfaces 1013, 1017. In one embodiment, at least one of the bubble vials 1050 may be fixed relative to the housing 1014. In another embodiment, at least one of the bubble vials 1050 may rotate relative to the housing 1014, similar to the rotatable bubble vial 106 illustrated in FIG. 1. For example, the bubble vial 1050*c* may be rotated to different angles (e.g., 30 degrees, 60 degrees, etc.) relative to the planar surfaces 1013, 1017.

In operation, the level 1010 slides relative to the ruler 1043 parallel to the longitudinal axis E via engagement between the recess 1033 and the edge 1037 of the ruler 1043. Because the rear surface 1029 and the ruler 1043 are coextensive, the level 1010 and the ruler 1043 are positioned flat on a work piece, e.g., a wall. Therefore, as the level 1010 moves along the ruler 1043, the levelness of the ruler 1043 is observed via the bubble vials 1050.

As one of ordinary skill will realize, many of the features, components, and methods described herein with respect to one embodiment are equally applicable to other or all of the embodiments. As such, the features, components, or methods described with respect to one embodiment should not be limited to that embodiment alone.

The invention claimed is:

1. A level configured to be selectively coupled to a work piece, the level comprising:
   a housing;
   an adjustable clamping mechanism configured to selectively couple the housing to the work piece, the adjustable clamping mechanism comprising:
   a first leg coupled to the housing;
   a second leg coupled to the housing;
   a spring received within the housing, the spring biasing the second leg toward the first leg such that the work piece is secured between the first leg and the second leg; and
   an actuator, wherein the second leg is moveable relative to the first leg by the actuator, and the actuator is moveable relative to the housing to move the second leg against a force provided by the biasing member;
   a first bubble vial coupled to the housing and operable to indicate a first levelness of the work piece; and
   a second bubble vial rotatably coupled to the housing about a first axis, the second bubble vial operable to indicate a second levelness of the work piece.

2. The level of claim 1, wherein the housing defines a first portion and a second portion, the first portion is rotatable relative to the second portion about a second axis that is perpendicular to the first axis, the first portion includes the adjustable clamping mechanism and the first bubble vial, and the second portion includes the second bubble vial, wherein the second leg is moveable relative to the first leg in a direction perpendicular to the second axis.

3. The level of claim 2, wherein the first portion is magnetically coupled to the second portion for selective detachment therebetween.

4. The level of claim 2, wherein the first portion and the second portion are spring biased towards each other.

5. The level of claim 2, wherein the first portion includes a rib that engages a first slot within the second portion such that the first portion is generally perpendicular to the second portion, and the rib engages a second slot within the second portion such that the first portion is generally parallel to the second portion.

6. The level of claim 1 further comprising an annular housing that couples the second bubble vial to the housing, the annular housing including a resilient member and the housing further including a plurality of grooves, the annular housing and the second bubble vial rotatable with respect to the housing such that the resilient member selectively engages one of the plurality of grooves to lock the angular position of the second bubble vial relative to the work piece.

7. The level of claim 6, wherein the annular housing includes two resilient members generally separated 180 degrees apart and the plurality of grooves extend 360 degrees around the housing such that when the annular housing rotates relative to the housing, the second bubble vial is located at discrete locations.

8. The level of claim 6, wherein the annular housing includes one resilient member and the plurality of grooves extend 180 degrees around the housing such that when the resilient member is rotated away from the plurality of grooves, the second bubble vial is located in non-discrete locations.

9. A level comprising:
a housing including a first side surface, a second side surface and a longitudinal axis, each of the first side surface and the second side surface defining a plane parallel to the longitudinal axis;
an adjustable clamping mechanism coupled to the housing and configured to selectively couple the housing to a work piece; and
a bubble vial coupled to the housing and rotatable about a first axis perpendicular to the plane defined by the first side surface and perpendicular to the longitudinal axis, the bubble vial operable to indicate a levelness of the work piece, wherein the bubble vial extends outward from first side surface in a direction of the first axis such that the bubble vial is visible from a line of sight coplanar with the plane defined by the first side surface;
wherein the adjustable clamping mechanism is spaced from the bubble vial along the longitudinal axis.

10. The level of claim 9, wherein the bubble vial is fixed within an annular housing, and the annular housing partially extends beyond the plane of the first side surface such that the annular housing and the bubble vial are visible from the line of sight coplanar with the plane of the first side surface, wherein the annular housing is surrounded by the first side surface.

11. The level of claim 9, wherein the bubble vial is moveable relative to the housing along the first axis.

12. The level of claim 11, wherein the bubble vial is positionable in a first position visible from the line of sight coplanar with one of the planes and a second position not visible from the line of sight coplanar with one of the planes.

13. The level of claim 9, wherein the adjustable clamping mechanism includes a first leg and a second leg coupled to the housing, and the second leg is biased towards the first leg by a biasing member to secure the work piece therebetween.

14. The level of claim 13, wherein the second leg is moveable relative to the first leg by an actuator, and the actuator is moveable relative to the housing to move the second leg against a force provided by the biasing member.

15. A level selectively coupled to a ruler, the level indicating a levelness of the ruler, the level comprising:
a housing comprising:
a top planar surface extending from a first end to a second end;
a bottom planar surface parallel to the top planar surface;
a first face surface;
a second face surface opposite the first face surface, wherein the top planar surface and the bottom planar surface are perpendicular to first and second face surfaces;
a longitudinal axis defining a length; and
a height perpendicular to the longitudinal axis, wherein the length is greater than the height;
a bubble vial supported by the housing; and
a recess extending the entire length of the top planar surface in the direction of the longitudinal axis, wherein the recess is configured to receive a portion of the ruler and the recess is adjacent the second face surface such that the second face surface and a side of the ruler are substantially coplanar with each other when the recess engages the ruler.

16. The level of claim 15, wherein the bubble vial is positioned between the first planar surface and the second planar surface.

17. The level of claim 16, wherein the recess is located below the top planar surface such that a lower edge of the ruler within the recess is below the top planar surface.

* * * * *